United States Patent
Sekiya et al.

(10) Patent No.: US 7,794,314 B2
(45) Date of Patent: Sep. 14, 2010

(54) SLIDE DOOR DEVICE FOR AIR CONDITIONER

(75) Inventors: Yoshihiro Sekiya, Saitama (JP); Yutaka Teruya, Saitama (JP); Toshio Tsubakida, Saitama (JP); Daisuke Araki, Saitama (JP)

(73) Assignee: Valeo Thermal Systems Japan Corporation, Saitama (JP)

( * ) Notice: Subject to any disclaimer, the term of this patent is extended or adjusted under 35 U.S.C. 154(b) by 1300 days.

(21) Appl. No.: 10/560,046

(22) PCT Filed: Jun. 8, 2004

(86) PCT No.: PCT/JP2004/007977
§ 371 (c)(1),
(2), (4) Date: Dec. 8, 2005

(87) PCT Pub. No.: WO2004/108449
PCT Pub. Date: Dec. 16, 2004

(65) Prior Publication Data
US 2006/0144582 A1    Jul. 6, 2006

(30) Foreign Application Priority Data

| | | | |
|---|---|---|---|
| Jun. 9, 2003 | (JP) | ............................ | 2003-163533 |
| Jun. 19, 2003 | (JP) | ............................ | 2003-174160 |
| Sep. 30, 2003 | (JP) | ............................ | 2003-339895 |
| Sep. 30, 2003 | (JP) | ............................ | 2003-339896 |
| Sep. 30, 2003 | (JP) | ............................ | 2003-340182 |
| Sep. 30, 2003 | (JP) | ............................ | 2003-340748 |
| Sep. 30, 2003 | (JP) | ............................ | 2003-341241 |
| Oct. 15, 2003 | (JP) | ............................ | 2003-354528 |

(51) Int. Cl.
*B60H 1/00* (2006.01)

(52) U.S. Cl. ..................... 454/334; 165/41; 165/42; 165/43; 454/121; 454/126; 454/156; 454/160; 454/161; 237/12.3 A; 237/12.3 B

(58) Field of Classification Search ......... 165/202–203, 165/41–43, 103; 454/121, 126, 156, 160, 454/161, 334; 237/12.3 A, 12.3 B
See application file for complete search history.

(56) References Cited

U.S. PATENT DOCUMENTS

2003/0171091 A1    9/2003    Uemura et al.

FOREIGN PATENT DOCUMENTS

DE    197 30 439 A1    2/1998

(Continued)

OTHER PUBLICATIONS

Supplemental European Search Report, for Application No. EP 04745687.6-2423, issued Mar. 4, 2008.
International Search Report mailed on Oct. 19, 2004.

*Primary Examiner*—John K Ford
(74) *Attorney, Agent, or Firm*—Rader, Fishman & Grauer PLLC

(57) ABSTRACT

An object of the present invention is to prevent vibration of a sliding door within a guide groove through a fundamental review of the structures adopted in sliding door devices in the related art having a sliding door made to move along a direction intersecting an air flow path to control the flow rate or direction of air within the air flow path. The present invention is characterized in that a tension-applying means is disposed at a sliding unit of a sliding door, which is inserted at a guide groove formed on the inside of an air-conditioner case to apply tension between the sliding unit and the guide groove.

3 Claims, 24 Drawing Sheets

FOREIGN PATENT DOCUMENTS

| | | |
|---|---|---|
| EP | 1 044 833 A | 10/2000 |
| EP | 1. 197 365 A1 | 4/2002 |
| JP | 09-193645 A | 7/1997 |
| JP | 09-317305 A | 12/1997 |
| JP | 10-278544 A | 10/1998 |
| JP | 10-297246 A | 11/1998 |
| JP | 11-020454 A | 1/1999 |
| JP | 2000-203243 A | 7/2000 |
| JP | 2001-113936 A | 4/2001 |
| JP | 2003-104032 A | 4/2003 |
| JP | 2003104034 A * | 4/2003 |
| JP | 2003-154835 A | 5/2003 |
| JP | 2004-098780 A | 4/2004 |
| JP | 2004-210034 A | 7/2004 |

* cited by examiner

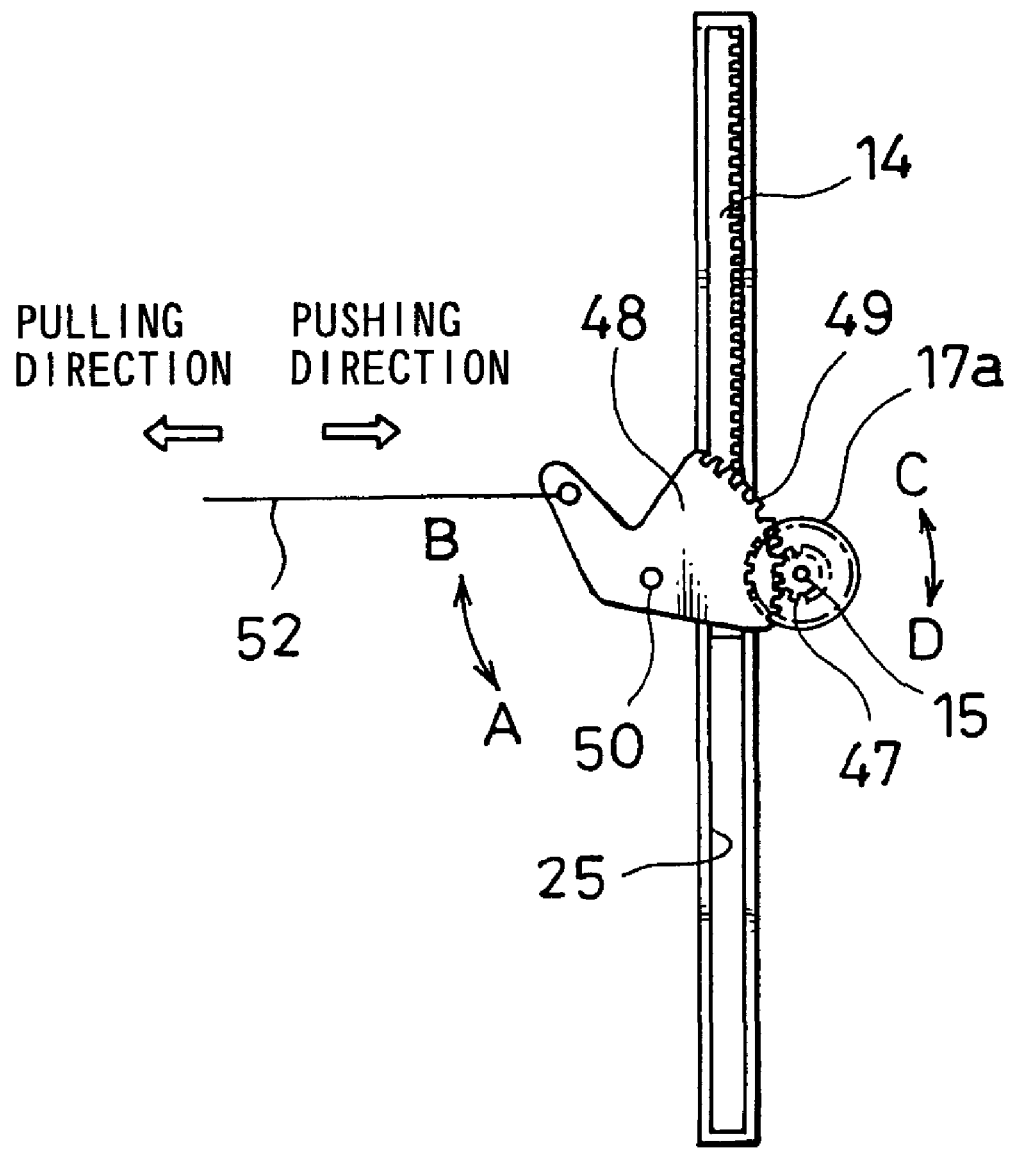

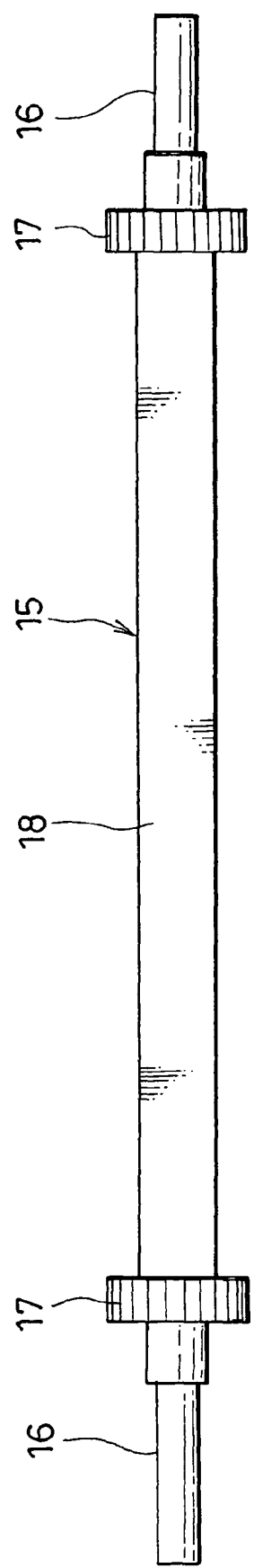
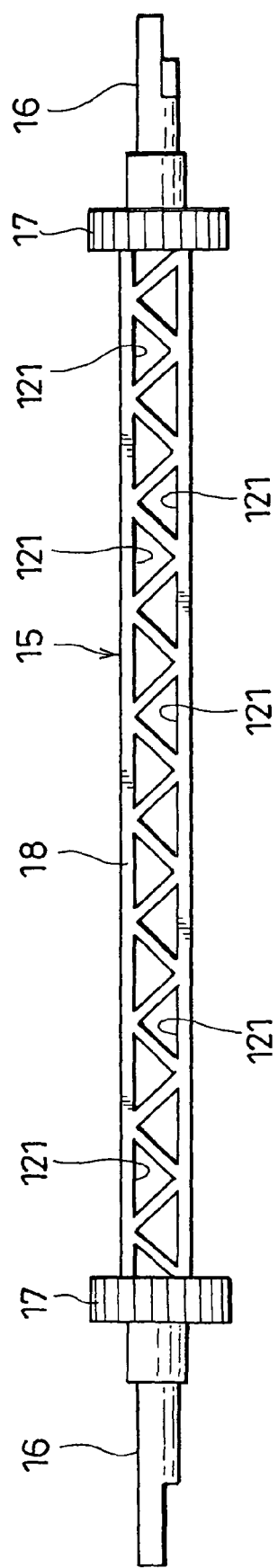
FIG. 18(a)
FIG. 18(b)

SLIDE DOOR DEVICE FOR AIR CONDITIONER

CROSS-REFERENCE TO RELATED APPLICATIONS

This application is the U.S. National Phase Application, under 35 USC 371 of International Application PCT/JP2004/007977, filed on Jun. 8, 2004, published as WO 2004/108449 A1 on Dec. 16, 2004, and claiming priority to JP 2003-163533 filed Jun. 9, 2003, JP 2003-174160 filed Jun. 19, 2003, JP2003-339895 filed Sep. 30, 2003, JP 2003-339896 filed Sep. 30, 2003, JP 2003-340182 filed September 30, JP 2003-340748 filed September 30, JP 2003-341241 filed September 30, and JP 2003-354528 filed Oct. 15, 2003, the disclosures of all of which are incorporated herein by reference.

TECHNICAL FIELD

The present invention relates to a sliding door device for an air-conditioning system, which is primarily used in an automotive air-conditioning system to control the flow of conditioning air.

BACKGROUND ART

An automotive air-conditioning system normally adjusts the temperature by using an air mix door. The air mix door, with which the quantity of air to be supplied to the heater core and the quantity of air to bypass the heater core are adjusted, is a single-point fulcrum door and the air quantity ratio is adjusted by altering the degree of openness of the door. In recent years, the use of so-called sliding doors, which are opened/closed as they slide linearly has become increasingly common as an alternative to the single-point fulcrum door, since the sliding door does not take up as much space.

For instance, patent reference literature 1 discloses a sliding door structure having a sliding door loosely fitted in guide grooves by setting the width of the sliding door slightly smaller than the distance between the guide grooves so as to assure good slidability.

Patent reference literature 2 discloses a structure of a sliding door (an air mix damper 6) constituted with a flat rectangular plate with a small thickness and racks 100 that extend along the sliding direction formed near each of the two side edges of the sliding door. The two side edges of the sliding door are inserted at guide grooves 26. The structure is characterized in that a pinion 101 interlocks with the air mix damper 6 so that the rotational force of a rotating shaft 102 causes the air mix damper 6 to move reciprocally.

The structure disclosed in patent reference literature 2 includes a heat reflecting surface 106 formed at the air mix damper 6 at a position further toward a heater 5 in order to assure dependable slidability of the air mix damper by preventing thermal deformation thereof that might otherwise be caused by heat radiated from the heater 5.

Patent reference literature 3 discloses a structure adopted in a sliding door 15 constituted with a flat rectangular plate, which is thin and flexible, with racks 16a and 16b extending along the longitudinal direction each formed near one of the two ends of the sliding door along the lateral direction and the two ends of the sliding door inserted at guide grooves 11a and 11b. The sliding door 15 is pressed against seat surfaces 10a, 10b and 10c via elastic members 19. The sliding door 15 is caused to move reciprocally by the rotational force imparted from a drive shaft 22, via pinions 21a and 21b interlocking with the racks 16a and 16b at the sliding door 15.

The structure disclosed in patent reference literature 3 requires the position at which the drive shaft and the sliding door are made to interlock with each other and the assembly direction along which the drive shaft and the sliding door are assembled together during the assembly of the air-conditioning unit to be set accurately, since the drive shaft and an external actuator used to rotate the drive shaft must achieve an optimal match.

Accordingly, the applicant of the present invention already proposed an invention that includes both an alignment function for ensuring that the sliding door and a shaft used to drive the sliding door are assembled together at an optimal position during the assembly of an air-conditioning unit and a temporary hold function which is engaged to temporarily hold the shaft to the sliding door (Japanese Patent Application No. 2002-379903).

The structure according to the invention disclosed in the above publication includes a pair of male engaging portions 26 projecting out from the shaft 15, a pair of female engaging portions 28 formed at the sliding door 23, a passing hole 29 at the shaft 15 and a hole 31 formed at the door main unit 15 at the surface on which racks 24 are formed. As pinions 17 at the shaft 15 become interlocked with the racks 24 and the pair of male engaging portions 26 and the pair of female engaging portions 28 become engaged with each other, positional alignment is achieved. Then, by aligning passing holes 29 with holes 31 and then inserting a jig 34 through the holes, the shaft becomes temporarily held onto the sliding door.

Patent reference literature 1 mentioned earlier also discloses a sliding door device having a sliding door that slides along a direction that intersects the air flow path. This sliding door device is characterized in that a sliding air mix door is disposed between the evaporator and the heater core, that a seal member is bonded onto the door main unit of the air mix door and that as the door main unit is caused to move along the direction intersecting the sliding direction at the sliding end position, the seal member is pressed against a contact portion formed at the case.

The primary object of the structure described above is an improvement in the quality of the seal achieved by moving the sliding door along the direction intersecting the sliding direction as the sliding door having moved through the guide grooves reaches the sliding end position and thus pressing the seal member against the contact portion formed at the air-conditioner case.

There is another structure known in the related art disclosed in patent reference literature 4 and adopted in a sliding door device that switches the air flow path in order to adjust the ratio of the quantity of air to pass through the heat exchanger used for heating in the air-conditioning unit and the quantity of air to bypass the heating heat exchanger. This structure includes racks formed at the sliding door and pinions disposed at the shaft, which are made to interlock with each other and, as the rotational movement of the shaft is communicated to the sliding door, the sliding door is caused to slide along the direction intersecting the direction of the air flow. However, the problem of dirt, dust and the like in the air taken in through the inside air/outside air intake ports entering the space between the rack at the sliding door and the pinion at the shaft to result in resistance against the movement of the sliding door or unpleasant noise during the sliding door operation is not addressed in the sliding door device for an air-conditioning system disclosed in patent reference literature 4.

Patent reference literature 5 discloses a structure that includes flexible sliding contact pieces disposed at a frontward position and a rearward position along the direction in which the roller unit advances. As the sliding door moves, the sliding contact pieces dispel any dirt, dust or the like from the guide surface of the rails, thereby preventing dirt, dust or the like from building up on the rails supporting the sliding door.

The single-point fulcrum doors in the related art include those adopting a structure in which the air mix door (plate door) is driven via a cable as disclosed in patent reference literature 6. The structure is adopted in a door drive device to prevent transmission of any force attributable to the deadweight of the plate door or the air pressure or the like to which the door is subjected, from the door side to the operation unit. The structure includes the air mix door 4 mounted so as to constitute an integrated unit together with a door shaft 41, a worm wheel 43 fixed onto the door shaft 41, a worm gear 441 at the shaft 44 made to interlock with a gear 434 at the worm wheel 4, a bevel gear 442 disposed at the shaft 44 and a spur wheel 450 made to interlock with the bevel gear 442. The spur gear 450 is formed at a plate 45 connected to a cable 47. The advisability of adopting this mechanism in conjunction with a sliding door is questionable.

Moreover, patent reference literature 7 discloses a structure adopted in a sliding door device that switches the air flow path in order to adjust the ratio of the quantity of air to pass through a heating heat exchanger in the air-conditioning unit and the quantity of air to bypass the heating heat exchanger, which includes racks disposed at the door main unit and pinions disposed at the shaft made to interlock with each other so as to slide the door main unit along a direction intersecting the direction of the air flow by transmitting the rotational movement of the shaft to the sliding door. The shaft in the sliding door device disclosed in the publication has a diameter, measured at a bridge portion disposed between the pinions, set to a relatively small value compared to the diameter at the cylindrical portion at the two ends thereof in order to minimize the air flow pressure.

Patent reference literature 1: Japanese Unexamined Patent Publication No. H10-278544

Patent reference literature 2: Japanese Unexamined Patent Publication No. H10-297246

Patent reference literature 3: Japanese Unexamined Patent Publication No. 2003-104032

Patent reference literature 4: Japanese Unexamined Patent Publication No. H11-20454

Patent reference literature 5: Japanese Unexamined Patent Publication No. H9-317305

Patent reference literature 6: Japanese Unexamined Patent Publication No. 2000-203242

Patent reference literature 7: Japanese Unexamined Patent Publication No. 2001-113936

DISCLOSURE OF THE INVENTION

Problems to be Solved by the Invention

The width of the sliding door is set smaller than the distance between the guide grooves, as described above, so as to assure good slidability of the sliding door through the guide grooves in the structure disclosed in patent reference literature 1. The disadvantage of the structure is that the sliding door is caused to vibrate as the air flowing through the air flow path impacts the sliding door, resulting in rattling and unpleasant noise. The structure is also prone to air leakage through the gaps.

Accordingly, it is necessary to effectively prevent rattling of the sliding door in the guide grooves and the occurrence of noise in the structure disclosed in patent reference literature 1, while assuring good slidability of the sliding door inside the guide groove.

In addition, the air-conditioner case is normally constituted of thin resin walls and is formed in a complicated shape with a large air flow path inside. These characteristics all make the air-conditioner case prone to deformation. Such deformation will be caused mostly by an external force. More specifically, different extents of deformation occurring at the mounting legs along the vertical direction during the installation of the air-conditioner case in the vehicle body result in stress, which is then transmitted to the case. Under such circumstances, torsional deformation will occur readily. Deformation may also be caused by the heat radiated from the heater core. Since the distance between the sliding door and the heater core tends to be set to a small value in order to meet the need to provide the automotive air-conditioning system as a compact unit, the sliding door may become heated by the heat radiated from the heater core, in which case, torsional deformation of the sliding door will occur readily.

While the air-conditioner case should never become deformed, deformation does in fact occur readily. If the air-conditioner case becomes deformed, it may, in turn, deform the linearly-shaped guide grooves through which the sliding door moves, into a curved shape. In such case, the contact between the linear sliding door and the guide grooves increases, resulting in a greater resistance, which is bound to reduce the slidability of the sliding door. Reliable movement of the sliding door is a crucial element in the temperature control, and if the sliding door cannot move smoothly, dependable air-conditioning control may be compromised.

Accordingly, it is necessary to assure smooth movement of the sliding door by taking appropriate measures at the sliding door itself even if the air-conditioner case should become deformed, resulting in a deformation of the guide grooves.

The alignment disclosed in Japanese Patent Application No. 2002-379903 is achieved by engaging the male engaging portions 26 with the female engaging portions 28. In an embodiment, the male engaging portions 26 are formed as projecting pieces with a predetermined width and the female engaging pieces 28 are formed as recessed grooves with a predetermined width matching that predetermined width of the projecting pieces constituting the male engaging portions. This gives rise to erroneously engaging the pair of the male engaging portions 26 at the shaft with the wrong female engaging portions 28 at the sliding door. Such erroneous assembly will alter the engaging structure at the shaft outside the air-conditioner case, disabling connection with an external device.

Accordingly, erroneous assembly must be effectively prevented when positioning the sliding door and the shaft that engages the sliding door in reciprocal movement relative to each other.

In addition, as disclosed in patent reference literature 1, a sliding door normally includes seal members projecting out along the sliding direction, each disposed at one of the two ends of the sliding door. However, the optimal ratio of the lateral dimension and the longitudinal dimension of the seal members has not been proposed to date. While longitudinally elongated (along the sliding direction) seal members allow for greater tolerance (dimensional tolerance) with regard to the seat margins (compression margins), seal members with an excessively large longitudinal dimension are prone to buckling or collapsing, which will then cause loss of the sealing function altogether.

Accordingly, it is necessary to provide a sliding door device assuring dependable sealability by selecting the optimal ratio of the longitudinal dimension of the seal members disposed at the ends of the sliding door to their lateral dimension.

While the structure of the sliding door intended for automotive applications in patent reference literature 5 is effective in dispelling dirt, dust and the like as long as the rail guide surface is dead level, the effectiveness of the dirt/dust dispelling means may be compromised if the sliding door includes a rack and a gear integrated via a plurality of teeth at the rack and a plurality of teeth at the gear interlocking with each other. Namely, the structure is not intended for removal of dirt, dust and the like that may collect on the pinion side at the shaft and moreover, dirt, dust and the like or dust clotted with moisture or the like in the narrow recesses between the teeth at the rack cannot readily be scraped out with the sliding contact pieces since their front ends need to be relatively flexible to avoid scarring.

Accordingly, it is necessary to prevent dirt, dust and the like contained in the air taken in through the inside air/outside air intake ports from becoming lodged between the rack at the sliding door and the pinion at the shaft by preempting the entry of dirt and dust at the recesses between the teeth at the rack of the sliding door and the pinion of the shaft constituting the sliding door device.

In addition, while the structure disclosed in patent reference literature 6 eliminates the adverse effect of the air pressure and the dead weight, the structure itself is complex and is bound to be costly, which poses difficulty in the feasibility for practical application. Also, as the air mix door is driven with the cable, the dead weight of the air mix door greatly affects the operation. More specifically, the operational force will vary significantly depending upon the direction along which the operation lever at the operation unit is moved, which is not desirable. Furthermore, when the cable is used along the pushing direction in order to pull up the air mix door installed to slide along the vertical direction, a great operational force will be required, due to the dead weight of the air mix door, which results in a significant force applied to the flexible cable along the compressing direction to cause buckling of the cable or defective setting.

Accordingly, cable buckling must be prevented reliably in order to improve the operability of the air mix door, i.e., in order to assure dependable operation, in conjunction with the drive system that employs a cable in its operation.

In recent years, the need to form the shaft as an integrated unit by using a synthetic resin or the like has grown. Since a sufficient level of material strength cannot be assured in the structure such as that disclosed in patent reference literature 7 with a bridge portion having a small diameter, the bridge portion must have a relatively large diameter compared to that in the related art disclosed in patent reference literature 1 or the like.

However, during a full cooling operation or a full heating operation through which part of the air having been cooled at the cooling heat exchanger first flows along the surface of the door main unit and then flows into a branch passage located on the open side, a significant air flow resistance against the air flow may be created by the bridge portion at the shaft with a greater diameter which is located in the middle of the air flow.

Accordingly, even when the bridge portion disposed between the pinions has a relatively large diameter compared to the related art in order to assure a sufficient level of strength for the shaft formed as an integrated unit by using a synthetic resin or the like in a sliding door device, the bridge portion at the shaft must not be allowed to create any air flow resistance during the full heating operation or the full cooling operation.

In addition, when the space between the door main unit and the contact portion is sealed, the door main unit must be moved in the direction intersecting the sliding direction in the structure disclosed in patent reference literature 1. This means that the linear movement of the door main unit cannot be sustained reliably near the sliding end position and that the door main unit needs to move against the air flow from the end position. Thus, it is difficult to assure a reliable linear movement or a smooth movement of the door main unit.

Accordingly, a seal member may be bonded onto the door main unit and this seal member may be placed in contact with the contact portion along the sliding direction at the sliding door stop position. However, a complete seal will not be achieved along the direction intersecting the sliding direction in this structure, which will result in a failure in assuring a sufficient level of seal between the door main unit and the case and an air leak through the gap between the seal member and the case.

While the leakage of air through the gap between the seal member and the case may be prevented by projecting the seal member bonded onto the door main unit toward the case and thus placing the seal member in sliding contact with the case. However, the structure compromises the durability of the seal member due to the friction of the seal member against the case and may also induce frictional noise. In addition, since a greater sliding resistance occurs if the seal member and the case are in contact when the door main unit moves, the door main unit may not be allowed to move smoothly.

Accordingly, in the sliding door device having the seal member and the contact portion set in contact with each other along the sliding direction at the sliding door stop position, a desired level of sealability must be assured for the sliding door and the case at the sliding door stop position, the durability of the seal member must be improved while preventing any frictional noise from occurring due to the friction between the seal member and the case and a smooth movement of the sliding door must be assured.

As described above, there are numerous problems to be addressed and a fundamental review of the sliding door devices in the related art is overdue. An object of the present invention, which has been completed by addressing the problems discussed above, is to provide a sliding door device for an air-conditioning system through which the problems described above can be solved.

Means for Solving the Problems

The present invention achieves the object described above by providing a sliding door device for an air-conditioning system which includes a sliding door that moves so as to intersect an air flow path and is used to control the flow rate of the air within the air flow path or the forced air current direction. The two ends of the sliding door are each constituted of sliding units that move in the guide grooves formed in the air-conditioner case. The sliding unit includes a tension applying means for applying tension between the sliding unit and the guide grooves. As the sliding door loosely fitted in the guide groove slides, a desirable level of tension is applied between the sliding door and the guide grooves. As a result, vibration and ultimately unpleasant noise can be prevented while sustaining an optimal sliding resistance.

In a specific embodiment, the sliding door is used as a so-called air mix door disposed so as to intersect the air flow path on the upstream side of a heating heat exchanger to adjust the ratio of the quantity of air to pass through the heating heat exchanger and the quantity of air to bypass the heating heat exchanger. In the embodiment, an air mix door with the advantages of the sliding door disclosed is provided.

The tension applying means is constituted with a point contact projection disposed at the center thereof and a linear non-contact projection disposed around the point contact projection with a gap formed between them. The gap may be set to, for instance, a value equal to or less than 1 mm. The point contact achieved with the point contact projection at the center does not increase the resistance to a great extent and thus, smooth sliding movement is assured. In addition, even if the point contact portion becomes worn after extended use, the non-contact projection disposed around it prevents any rattling in place of the point contact projection. While a gap equal to or less than 1 mm is formed, deformation of the guide groove or the sliding door will set the non-contact projection in contact so as to sustain the tension application. The point contact projection is supported at a tension bridge formed over an area surrounded by the non-contact projection. Since such a tension bridge can be formed as an elastic member with ease, tension can be applied from the point contact projection with a high level of effectiveness. In addition, the sliding unit assumes a notched shape achieved by alternating projected portions with indented portions. This shape allows the sliding unit to flex readily and also allows it to be formed as a lightweight unit.

The problems discussed above are also solved in a sliding door device for an air-conditioning system according to the present invention, in which the sliding door is disposed so as to intersect the air flow path on the upstream side of a heating heat exchanger to adjust the ratio of the air to pass through the heating heat exchanger and the air to bypass the heating heat exchanger, with a longitudinal rib formed so as to continuously extend linearly along the direction in which the sliding door slides.

Since the longitudinal rib continuously extends along the sliding direction at the sliding door, the sliding door does not readily become distorted along the longitudinal direction even when distortion occurs at the guide grooves due to distortion of the air-conditioner case. At the same time, the absence of ribs along a diagonal direction allows the sliding door to become distorted along the diagonal direction. This means that the sliding door is allowed to undergo the process of torsional deformation as torsional distortion occurs at the guide groove so that it is still allowed to move smoothly within the guide groove.

In addition, lateral ribs extending linearly along the direction perpendicular to the sliding direction are formed at the sliding door. The presence of such lateral ribs creates a relatively high level of protection against distortion along the lateral direction, and the longitudinal ribs and the lateral ribs together allow the sliding door to withstand the pressure of the forced air. However, since no ribs are formed along the diagonal direction, the sliding door is allowed to become distorted along the diagonal direction. In other words, the sliding door is allowed to undergo the process of torsional deformation as torsional deformation occurs at the guide grooves so that it is able to move smoothly through the guide grooves.

The lateral rib may be constituted with a single protruding flat surface portion or it may be formed as a plurality of indented flat surface portions formed continuously. In addition, the lateral rib may be constituted with a plurality of indented flat surface portions disposed with an offset so as to avoid an overlap on the two sides of the longitudinal rib. It is to be noted that elastic flexibility is assured along the lateral direction.

The sliding door includes a protruding flat surface portion and an indented flat surface portion formed alternately along the longitudinal direction, and elastic flexibility is assured along the longitudinal direction. In addition, the sliding door does not include any ribs formed along a diagonal direction so as to ensure that the sliding door can twist readily.

The sliding door device for an air-conditioning system according to the present invention may further include a shaft rotatably disposed at a position in close proximity to the sliding door, which is used to cause the sliding door to move. A pair of male engaging portions may project out from the circumferential surface of the shaft, a pair of female engaging portions that are allowed to engage with the pair of male engaging portions may be formed at a surface of the sliding door at which a pair of racks are formed, and the male engaging portions and the female engaging portions may adopt an engaging structure that only allows them to be engaged with each other through a correct engagement.

In this case, since the pair of male engaging portions and the pair of female engaging portions are not allowed to engage with each other incorrectly, erroneous assembly of the shaft at the sliding door is prevented. In other words, the shaft cannot even be temporarily held at the sliding door and thus, erroneous assembly is effectively prevented.

In a specific embodiment, the sliding door is used as a so-called air mix door disposed so as to intersect the air flow path on the upstream side of the heating heat exchanger to adjust the ratio of the quantity of air to pass through the heating heat exchanger and the quantity of air to bypass the heating heat exchanger. In the embodiment, an air mix door with the advantages of the sliding door disclosed is provided.

The engaging structure that disallows incorrect engagement may be achieved by forming the pair of male engaging portions in different sizes and by forming the pair of female engaging portions in different sizes in correspondence to the different sizes of the pair of male engaging portions. More specifically, the widths of the pair of male engaging portions may be set differently from each other and, in correspondence, the widths of the pair of male engaging portions may be set different from each other. Namely, the engaging structure can be achieved by varying the shapes of the pair of male engaging portions and also varying the shapes of the pair of female engaging portions in correspondence.

The sliding door device for an air-conditioning system according to the present invention may further include a seal member disposed at an end of the sliding door, which becomes pressed against a contact portion formed at the member constituting the air flow path at the sliding end position along the direction in which the sliding door moves. The seal member, projecting out from the sliding door along the moving direction, may achieve a ratio of its longitudinal dimension to its lateral dimension within a range of 1 or more and 2 or less. This allows for an ample seat margin at the seal member and, at the same time, when the seal member is seated, it does not buckle or collapse. If the ratio of the longitudinal dimension to the lateral dimension is less than 1, a sufficient seat margin cannot be achieved and thus, air leakage may become an issue. If the ratio is greater than 2, the seal member also tends to buckle or collapse readily, which also leads to a problem of air leakage.

In a specific embodiment, the sliding door is used as a so-called air mix door disposed so as to intersect the air flow path on the upstream side of the heating heat exchanger to adjust the ratio of the quantity of air to pass through the heating heat exchanger and the quantity of air to bypass the heating heat exchanger. In the embodiment, an air mix door with the advantages of the sliding door is provided. In addition, the lateral dimension of the seal member at the sliding door is set equal to or greater than 5 mm. The longitudinal dimension corresponding to the lateral dimension of 5 mm is equal to or greater than 5 mm and equal to or less than 10 mm, which assures a satisfactory seal.

Alternatively, a sliding door device for an air-conditioning system according to the present invention may comprise an air-conditioner case having an air flow path formed therein, a sliding door fitted at guide grooves formed at the air-conditioner case at the two sides thereof constituting the side surfaces of the air flow path, at a position further upstream of the heating heat exchanger and a shaft rotatably bridging the air-conditioner case constituting the side surfaces of the air flow path and disposed at a position in close proximity to the sliding door. In this sliding door device, racks formed on the upwind side of the sliding door each fit with pinions formed at the shaft so as to allow the sliding door to slide through the grooves. The racks at the sliding door and the pinions formed at the shaft may be covered with cover members extending from the circumferential edges of the guide grooves.

In this structure, the cover members in the air-conditioning unit according to the present invention may be formed as an integrated part of the air-conditioner case, and the cover members may extend from the circumferential edges of the guide grooves along walls constituting side surfaces of the air flow path at the air-conditioner case.

Alternatively, the sliding door device for an air-conditioning system according to the present invention may include a sliding door disposed so as to intersect an air flow path at a position upstream of a heating heat exchanger to be used to adjust the ratio of the quantity of air to pass through the heating heat exchanger and the quantity of air to bypass the heating heat exchanger. In the sliding door device, the sliding door may be made to move along the vertical direction in which the deadweight thereof is applied and an extensible cable may be used as a means for adjusting the openness of the sliding door. In this structure, the cable may be operated along the pulling direction when the sliding door needs to move against gravity.

In the sliding door device described above, the cable is operated along the pulling direction when the sliding door needs to move against gravity, which prevents buckling of the flexible cable. When the cable is operated along the pushing direction to move the sliding door along the direction of gravity, the deadweight of the sliding door minimizes the force applied to the cable along the compressing direction, and thus, buckling does not occur. In addition, since the deadweight is applied to the cable, the play in the cable is reduced, which adds another advantage of reduced cable hiss.

Alternatively, the sliding door device for an air-conditioning system according to the present invention may include a sliding door disposed so as to intersect an air flow path at a position upstream of a heating heat exchanger to be used to adjust the ratio of the quantity of air to pass through the heating heat exchanger and the quantity of air to bypass the heating heat exchanger. In the sliding door device, the sliding door may be made to move along the vertical direction in which the deadweight thereof is applied and an extensible cable may be used as a means for adjusting the openness of the sliding door. In this structure, the sliding door may be set so that the cable is extended to the greatest extent when the sliding door moves to the uppermost position and that deadweight is added onto the drive force imparted by the cable as the sliding door descends.

In the sliding door device described above, the cable is always operated along the pulling direction when the sliding door moves against gravity, whereas the cable is operated along the retracting (pushing) direction when the sliding door moves along the direction of gravity. As a result, the operational force along the pushing direction is reduced to minimize the occurrence of buckling.

Furthermore, when the sliding door moves to the uppermost position, the forced air is supplied to the heater core in its entirety, and also the forced air is supplied in its entirety to the heater core when the cable is in the most extended state.

A sliding door device according to the present invention may include a shaft rotatably bridging side surfaces of an air flow passage, axially supported portions each formed at one of the two ends of the shaft and each axially supported at a side wall defining the air flow passage, pinions disposed inward relative to the axially supported portions and a bridge portion disposed between the pinions with a ventilating passage formed so as to pass through the bridge portion. The shaft structured as described above may be used as described below as a feature of the sliding door device for an air-conditioning system.

The shaft rotatably bridging the side surfaces of the air flow passage, at which axially supported portions each formed at one of the two ends of the shaft with each end axially supported at a side wall defining the air flow passage, pinions disposed inward relative to the axially supported portions and a bridge portion disposed between the pinions are formed with a ventilating passage formed so as to pass through the bridge portion is used in conjunction with a door main unit to adjust the ratio of the quantity of air to pass through a heating heat exchanger and the quantity of air to bypass the heating heat exchanger with racks formed at a surface thereof ranging so as to intersect the direction of air flow. The pinions at the shaft are made to interlock with the racks at the door main unit to allow the door main unit to slide along the direction intersecting the direction of the air flow. The shaft and the door main unit should be assembled together so as to set the ventilating passage at the shaft and the surface of the door main unit at which the racks are formed substantially parallel to each other when the door main unit reaches its sliding end position relative to the shaft.

In this case, the air flow path extending on the side where the air flow bypasses the heating heat exchanger is completely closed off by the door main unit during a full heating operation and the air flow path on the side where the air passes through the heating heat exchanger is completely closed off by the door main unit during the full cooling operation. As a result, the air passing through the area of the cooling heat exchanger facing opposite the door main unit blocking the air flow path flows along the surface of the door main unit at which the racks are formed toward the air flow path that is not closed off by the door main unit, i.e., either the air flow path through which the air travels by bypassing the heating heat exchanger or the air flow path through which the air passes through the heating heat exchanger. Since the ventilating passage formed at the bridge portion extends substantially parallel to the surface of the door main unit at which the racks are formed, the air flowing as described above passes through the ventilating passage and consequently, the bridge portion of the shaft does not create an air flow resistance even if its diameter is increased to improve the strength.

Another sliding door device according to the present invention comprises an air-conditioner case with an air flow path formed therein, a sliding door that is guided along a guide unit formed at the air-conditioner case to slide along a direction intersecting the air flow path and a seal member disposed at the sliding door, which is pressed along the sliding direction against a contact portion formed on the air-conditioner case side at a position at which the sliding door stops. The seal member in this sliding door device may be disposed so as to be allowed to move while forming a gap between itself and the air-conditioner case and a pressure-responsive deformation portion that becomes deformed along a direction different from the sliding direction upon pressure contact with the contact portion to come into close contact with the air-conditioner case may be formed at the seal member.

In this structure, as the sliding door slides to the stop position, the pressure-responsive deformation portion is pressed against the contact portion and becomes deformed along a direction different from the sliding direction to come into close contact with the air-conditioner case. As a result, an airtight seal is achieved between the sliding door and the air-conditioner case.

More specifically, such a pressure-responsive deformation portion may be formed as a deformable bump that projects out along the sliding direction at an end of the seal member and becomes elastically deformed along the direction intersecting the sliding direction when it is pressed against the contact portion. Such a deformable bump becomes deformed along the direction intersecting the sliding direction as the sliding door slides to the stop position and it is pressed against the contact portion, setting the seal member in close contact with the air-conditioner case and thus sealing the space between the sliding door and the air-conditioner case.

The deformable bump, which becomes elastically deformed to come into contact with the air-conditioner case may contact the guide portion as it is pressed against the contact portion, or if the air-conditioner case includes a wall portion that faces opposite the surface of the sliding door where the seal member is disposed, the deformable bump may come into contact with the wall portion as it is pressed against the contact portion.

In addition, the wall portion may range along the contact portion at the air-conditioner case, or it may be constituted as a rib raised upright along the sliding direction and ranging along the contact portion, with the seal member disposed at an end of the sliding door along the sliding direction. Alternatively, there may be wall portions ranging along the two sides of the contact portion, with the distance between the wall surfaces facing opposite each other gradually becoming smaller as they range further away from the opening end at which the pressure-responsive deformation portion is inserted.

EFFECT OF THE INVENTION

A constant level of tension is applied from the sliding door to the guide groove via the tension applying means, preventing vibration and ultimately preventing unpleasant noise despite the impact of the air. In addition, the structure provides better prevention against air leakage. The tension applying means includes a point contact projection with the minimum contact area, with which the sliding resistance can be kept down to a lower level, and a linear non-contact projection disposed around the point contact projection, with which tension can be applied if the point contact projection collapses. In addition, the point contact projection is supported at the tension bridge, which facilitates the application of an elastic force. Moreover, since the sliding unit adopts a notched structure, it can be provided as a lightweight unit, assuring good flexibility.

The sliding door does not bend readily along the longitudinal direction or the lateral direction but bends readily along the diagonal direction. Thus, even if the guide groove becomes deformed through torsional deformation, the sliding door can still move smoothly since it too, undergoes torsional deformation in such a case.

A pair of male engaging portions and a pair of female engaging portions need to engage each other correctly when the sliding door and the shaft which causes reciprocal movement of the sliding door are assembled together and thus, erroneous assembly is prevented. This erroneous assembly prevention is achieved through a very simple structure.

The ratio of the longitudinal dimension to the lateral dimension of the seal member disposed at an end of the sliding door is set in the range equal to or greater than 1 and equal to or less than 2. As a result, a sufficient seat margin is assured and also, the seat does not buckle or collapse when the seal member becomes seated or when a force is applied along the longitudinal direction, thereby effectively preventing air leakage. In addition, the lateral dimension of the seal member should be equal to or greater than 5 mm. If the lateral dimension of the seal member is set at 5 mm, its longitudinal dimension is set to 5 mm 10 mm.

The cover members covering the racks and pinions prevent entry of dirt and dust into the recessed areas of the racks at the sliding door and the pinions at the shaft. As a result, entry of foreign matter such as dirt and dust mainly contained in the air taken in through the outside air intake port into the space between the racks at the sliding door and the pinions at the shaft can be effectively prevented.

The cover members can be formed concurrently while forming through die cutting the side surfaces of the air flow path in an air-conditioner case constituted with a plurality of case members. In this manner, the air-conditioner case with cover members can be manufactured without having to add an extra manufacturing step and thus, the manufacturing cost for the air-conditioner case that includes such cover members does not need to be higher than the manufacturing cost of an air-conditioner case without cover members in the related art.

The sliding door used to control the air-conditioning air is operated via a drive system which employs a cable. The cable is operated along the pulling direction when the sliding door needs to move against gravity, and the cable is operated along the pushing direction when the sliding door moves along the direction of gravity, thereby ensuring that the cable does not buckle. In addition, since the deadweight of the cable is at work at all times, the play in the cable is reduced to lower the extent of cable hissing.

The ventilating passage formed at the bridge portion of the shaft extends substantially parallel to the surface of the door main unit where the racks are formed during a full heating operation or a full cooling operation. Thus, during a full heating operation or a full cooling operation, part of the air having been cooled at the cooling heat exchanger, which flows along the surface of the door member unit where the racks are formed, passes through the ventilating passage formed in the bridge portion at the shaft. This means that even when the diameter of the bridge portion at the shaft is set to a relatively large value compared to the diameter of an equivalent portion in the related art, the bridge portion at the shaft does not impose significant air flow resistance. As a result, it is no longer necessary to secure space between the cooling heat exchanger and the sliding door device to assure smooth air flow or to narrow the bridge portion at the shaft, which, in turn, allows the air-conditioning unit to be provided as an even more compact unit and sustains and improves the strength at the bridge portion of the shaft.

A seal member, which is pressed along the sliding direction against the contact portion formed on the air-conditioner case side when the sliding door reaches the stop position, is disposed at the surface of the sliding door. The seal member is allowed to move while sustaining a gap between itself and the air-conditioner case. The seal member includes a pressure-responsive deformation portion that becomes deformed along a direction different from the sliding direction and comes into close contact with the air-conditioner case when it is pressed against the contact portion. As a result, a high level of sealability is assured between the sliding door and the air-conditioner case at the sliding door stop position. In addition, since the pressure-responsive deformation portion becomes deformed only at the sliding door stop position to come into contact with the air-conditioner case, the pressure-responsive deformation portion does not slide in contact with the air-conditioner case when the sliding door moves to assure good durability for the seal member. Moreover, no frictional noise attributable to friction against the case occurs and a smooth movement of the sliding door is assured.

DESCRIPTION OF THE DRAWINGS

FIG. 17 schematically illustrates the sliding door drive system;

FIGS. 18(a) and 18 (b) are overall views of a shaft structure, with FIG. 18(b) specifically showing an overall view of a structure that includes ventilating passages formed at the bridge portion;

Figure 1:
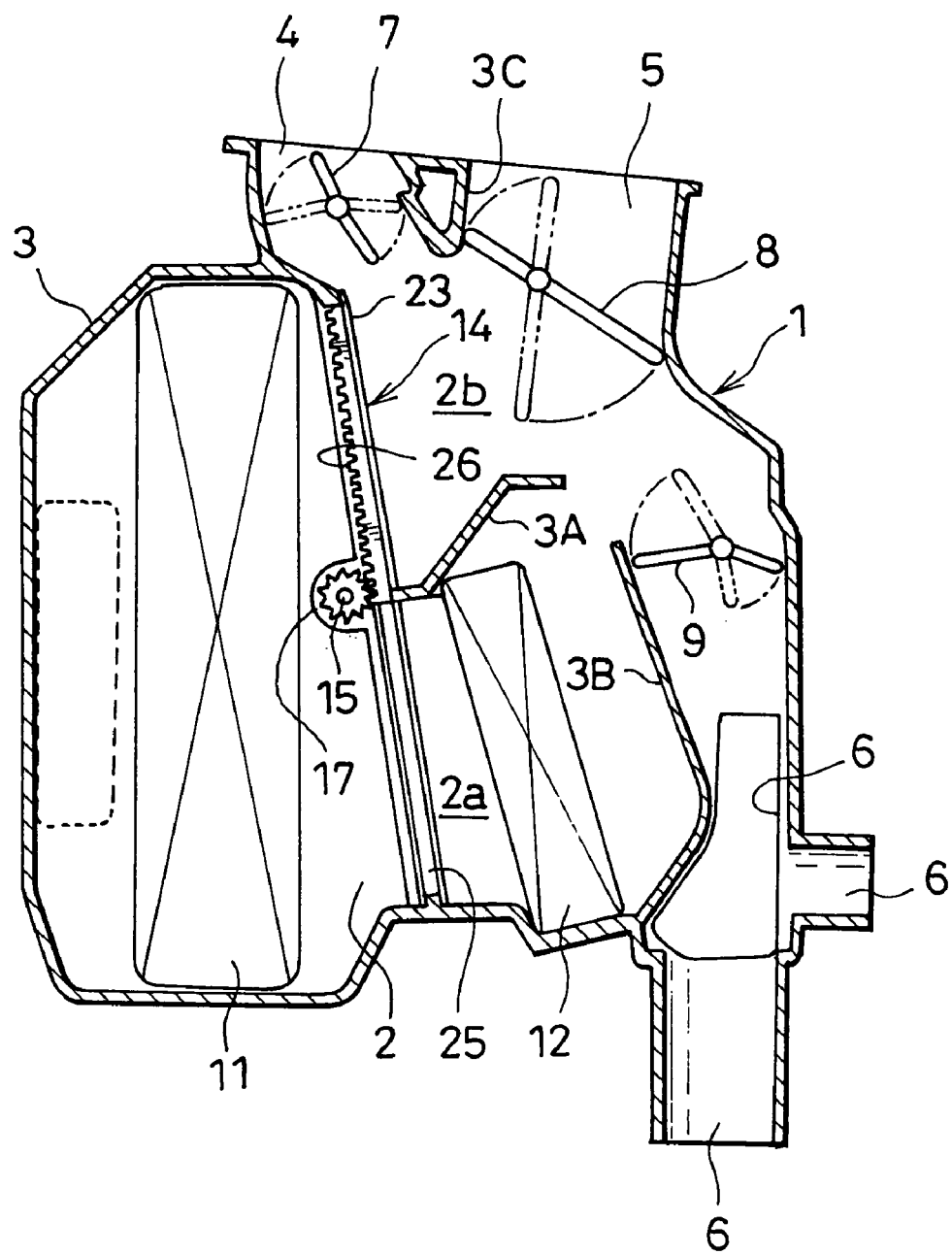
FIG. 1 is a longitudinal sectional view of an automotive air-conditioning system in which a sliding door for an automotive air-conditioning system according to the present invention is adopted.

EXPLANATION OF REFERENCE NUMERALS 1 automotive air-conditioning system
2 air flow path
2a branch flow path
2b branch flow path
3 air-conditioner case
3A, 3B, 3C wall defining air flow path
11 evaporator
12 heater core
14 sliding door device
15 shaft
16 axially supported portion
17, 17a, 17b pinion
18 bridge portion
22a, 22b male engaging portion
23 sliding door
24 sliding unit
25 guide groove 26, 26a, 26b rack
27 tension applying means
29a, 29b female engaging portion
30 non-contact projection
31 point contact projection
32 tension bridge
35a, 35b, 35c, 35d, 35e, 35f indented flat surface portion
36a, 36b, 36c, 36d, 36e, 36f protruding flat surface portion
40 seal member
46 pinion
48 drive lever
50 shaft
52 cable
54 operation device
55 lever
57 guide unit
61a, 61b guide rib
62 seat surface
69 contact portion
70, 71, 72 seal member
70a pressure-responsive deformation portion
71a, 72a deformable bump
73 barrier wall
74 contact portion
75 wall portion
80 wall portion
121 ventilating passage
131 cover member
131A flat portion
131 semicylindrical portion

BEST MODE FOR CARRYING OUT THE INVENTION

The following is an explanation of preferred embodiments of the present invention, given in reference to the drawings.

An automotive air-conditioning system 1 in FIG. 1 includes an air-conditioner case 3 having an air flow path 2 formed therein and air is fed from a blower fan (not shown) disposed on the upstream side relative to the air-conditioner case 3. At the downstream end of the air flow path 2, a defogger outlet passage opening 4, a vent outlet passage opening 5 and a foot outlet passage opening 6, each corresponding to a specific outlet mode, are disposed, with mode doors 7, 8 and 9, which are used to distribute temperature-controlled air, disposed respectively at the openings 4, 5 and 6.

An evaporator 11 set upright so as to block the entirety of the air flow path 2, through which all the air taken into the air-conditioner case 3 is to pass, is disposed on the upstream side of the air flow path 2. In addition, a heater core 12 set so as to partially block the air flow path 2 is disposed downstream of the evaporator 11. The evaporator 11, which is connected through piping with a compressor, a condenser, an expansion valve and the like (not shown) to constitute a cooling cycle, cools air passing through the evaporator 11 with a coolant supplied via the compressor. In addition, air passing through the heater core 12 is heated with engine cooling water supplied to the heater core 12.

A sliding door device 14, which slides along a direction intersecting the air flow path 2, and adjusts the ratio of the quantity of air to flow through a branch flow path 2a passing through the heater core 12 and the quantity of air to flow through a branch flow path 2b bypassing the heater core 12, is disposed in a space between the evaporator 11 and the heater core 12, located at a position that is downstream of the evaporator 11 and upstream of the heater core 12.

Figure 2:
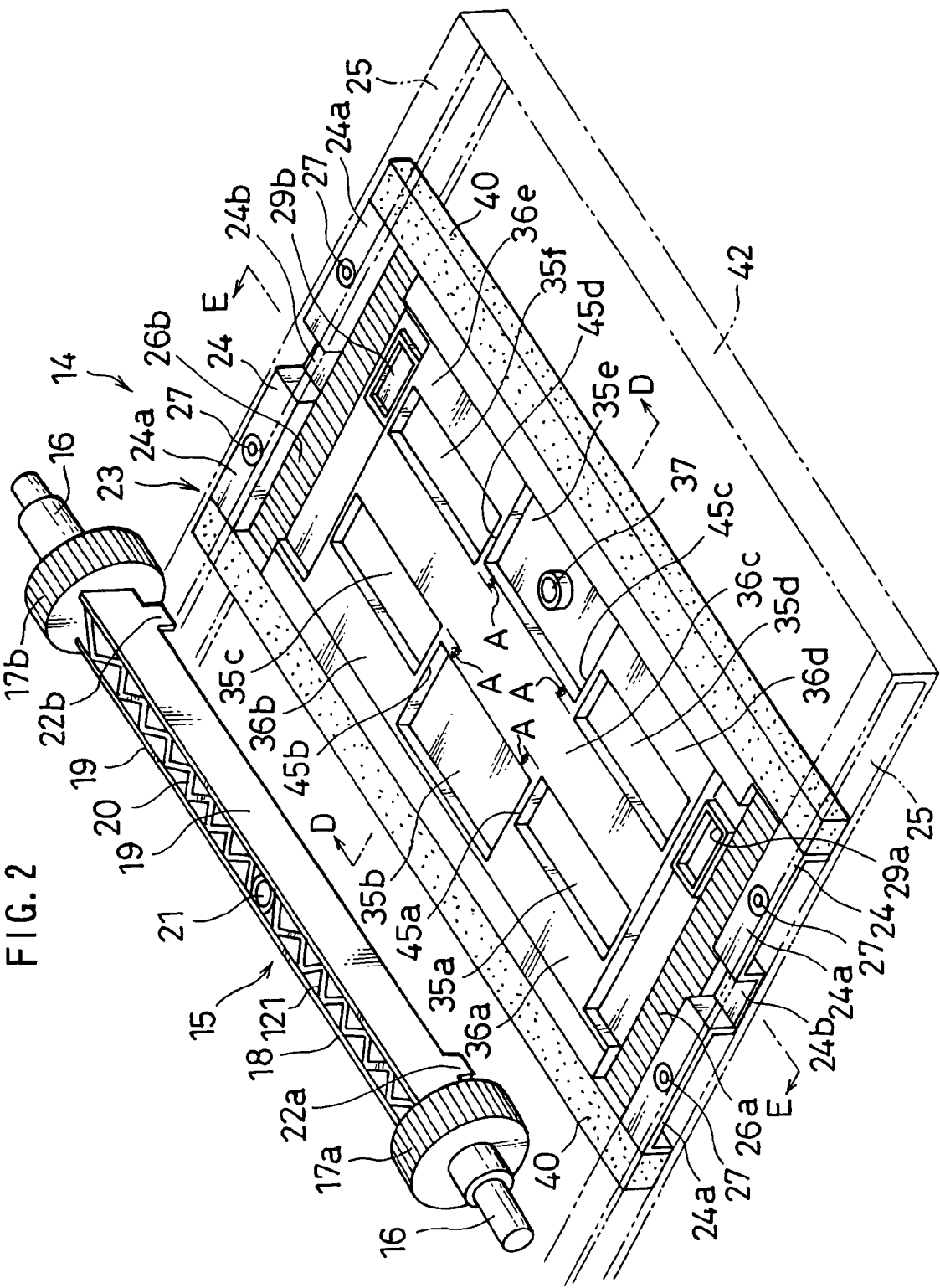
FIG. 2 is a perspective showing the shaft disengaged from the sliding door.

As shown in FIG. 2, the sliding door device 14 primarily comprises a shaft 15 and a sliding door 23. The sliding door 23 is driven by a force transmitted from the shaft 15, which is to be explained next. The shaft 15 is formed as an integrated unit constituted of, for instance, a synthetic resin and is rotatably set so as to bridge the side surfaces of the air flow path 2. As shown in the figure, axially supported portions 16 each to be axially supported at one of the side surfaces of the air flow path 2 in the air-conditioner case 3 are formed at the two ends of the shaft with disk-shaped pinions 17a and 17b each having numerous teeth formed inward relative to the axially supported portions 16.

A bridge portion 18 extending between the pinions 17a and 17b at the shaft 15 is constituted with two elongated plates 19 and 19 facing opposite each other and connecting pieces 20 that connect the two elongated plates to each other, with a ventilating passage 121 formed between the individual connecting pieces 20 or between the connecting pieces 20 and the elongated plates 19 in this embodiment. In addition, at the center of the shaft 15, a temporary holding pin insertion hole 21 is formed and male engaging portions 22a and 22b are formed near the pinions 17a and 17b respectively.

The sliding door 23 in the embodiment assumes a flat plate shape, and sliding units 24 (24a and 24b) each disposed at the one of the two ends of the sliding door along the lengthwise direction are slidably fitted inside guide grooves 25 formed at the air-conditioner case 3, as shown in FIG. 2. The sliding door 23 also includes racks 26a and 26b formed inward relative to the sliding units 24 and 24 to interlock with the pinions 17a and 17b. This structure allows a rotational force applied to the shaft 15 to be communicated to the sliding door 23 via the pinions 17a and 17b and the racks 26a and 26b, which will cause the sliding door 23 to slide along the length of the guide grooves 25 in a direction intersecting the air flow path 2.

Figure 3:
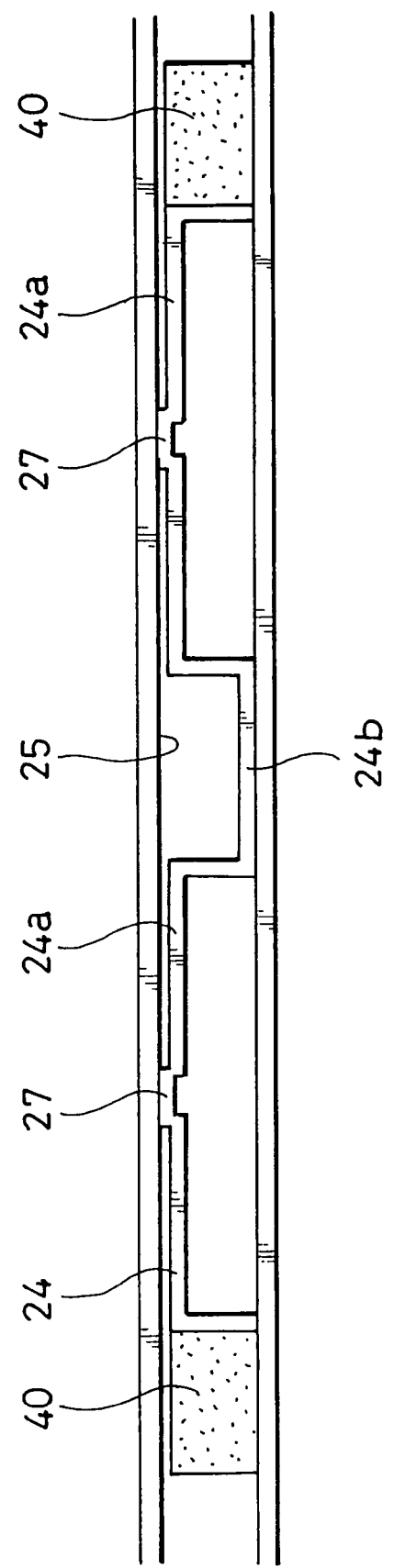
FIG. 3 is an enlarged sectional side elevation of a sliding unit at the sliding door.

As shown in FIG. 3, a degree of flexibility is achieved at the sliding units 24 and 24 at the sliding door 23 by adopting a notched shape over a predetermined range (matching the width of the guide grooves 25) which includes projected portions 24a and 24a and a recessed portion 24b located between the projected portions, all formed along the sliding direction, as shown in FIG. 3. In addition, a tension applying means 27 is formed at each projected portion 24a so as to apply a desired level of tension between the sliding door and the guide grooves 25.

Figure 4:
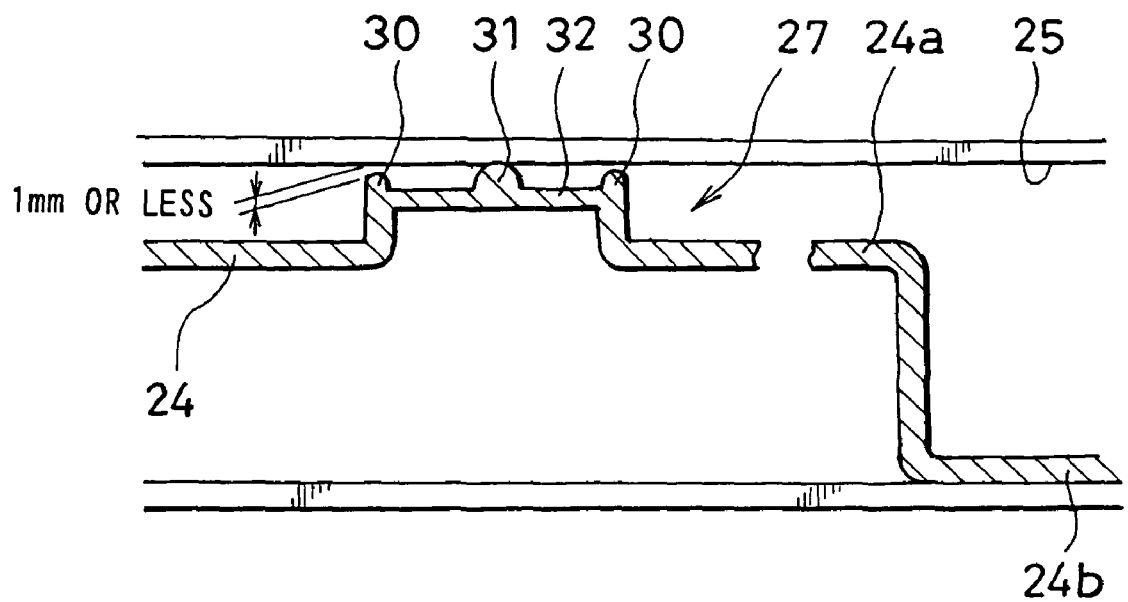
FIG. 4 is an enlarged sectional view of the tension-applying means.
Figure 5:
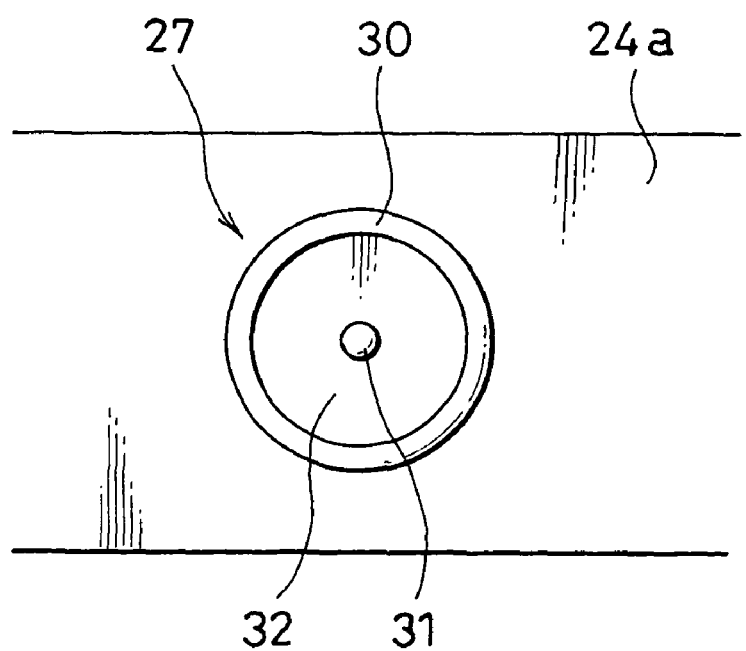
FIG. 5 is a plan view of the tension applying means.

As shown in enlargements in FIGS. 4 and 5, the tension applying means 27 each include a linear non-contact projection 30 which projects out from the projected portion 24a. The projection 30 assumes a substantially circular shape and has a clearance of 1 mm or less from the guide groove 25. At the center of a tension bridge 32 surrounded by the non-contact projection 30, a point contact projection 31 is formed to come into contact with the inner side surface of the guide groove 25. Namely, elasticity can be achieved easily at the tension bridge 32, which is flat, and thus, a desired level of tension can be applied to the point contact projection 31.

Figure 6:
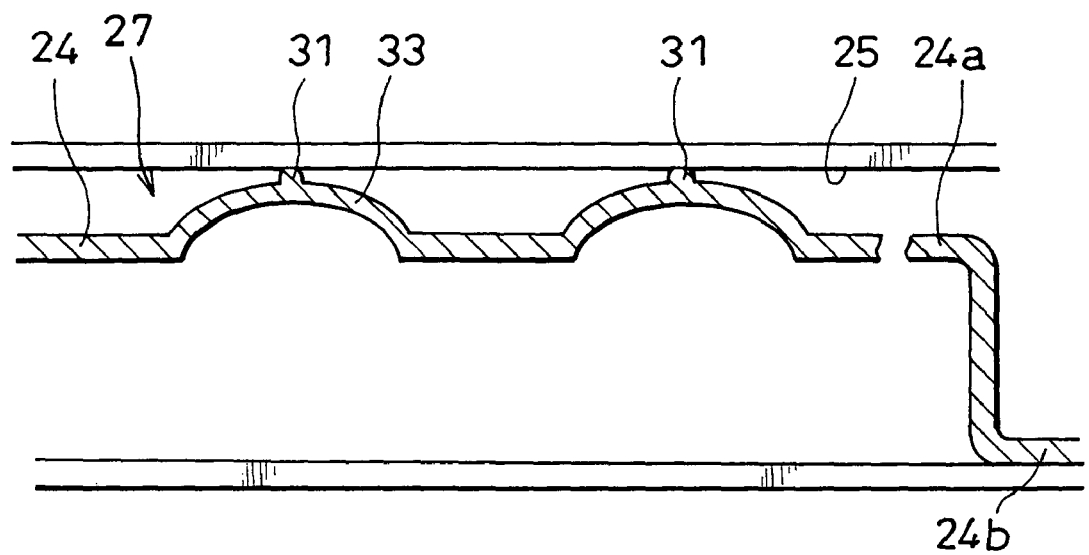
FIG. 6 is an enlarged sectional view of another embodiment of the tension applying means.

The point contact projection 31 achieves point contact with the guide groove 25 and, for this reason, only a minimal increase in resistance occurs. As the point contact projection 31 is used over a number of years, it may become worn or collapse, but even in such an eventuality, the lower non-contact portion 30 set at a position lower than the projection by 1 mm or less comes into contact with the inner surface of the guide groove 25, thereby still preventing rattling. It is to be noted that such a tension applying means 27 is disposed at two positions at each sliding unit 24 and thus, the effect is dependable. The tension applying means 27 may instead adopt a structure shown in FIG. 6. In this example, each tension applying means includes two point contact projections 31 each formed on a tension rib 33. The sliding door 23 with the tension applying means 27 structured as described above can be manufactured through vertical die cutting, which only requires inexpensive dies, thereby allowing the manufacturing cost to be lowered.

Female engaging portions 29 and 29, formed inward relative to the racks 26 and 26 at the sliding door 23, project out to engage with the male engaging portions 22 and 22 for purposes of positioning when the shaft is held temporarily onto the sliding door. Indented flat surface portions 25 and protruding flat surface portions 26 are disposed in a staggered pattern over almost the entire sliding door 23. It is to be noted that reference numeral 37 indicates a hole formed at the sliding door 23 for purposes of temporarily holding the shaft.

At the sliding door 23 structured as described above, seal members 40 constituted of a soft resin such as urethane are disposed at the two ends thereof along the sliding direction. As the sliding door reaches a sliding end position through the guide grooves 25, either seal member 40 comes in contact with a contact portion 42 at the air-conditioner case 3 and becomes compressed by the force of the movement of the sliding door. Namely, the seal margin is compressed and since the resulting reactive force does not act along the direction in which the sliding door and the guide grooves 25 contact each other, the seal member 40 comes into close contact with the contact portion 42. As a result, leakage of air is effectively prevented.

Figure 7:
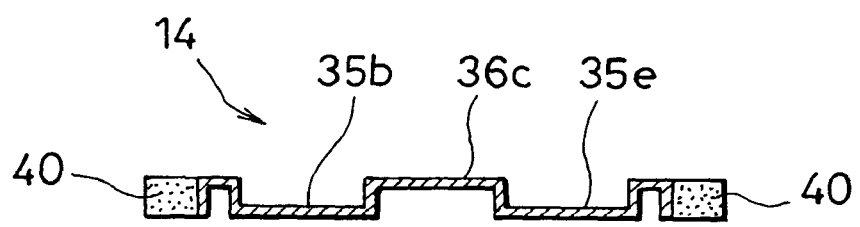
FIG. 7 is an end view taken along line D-D in FIG. 2.
Figure 8:
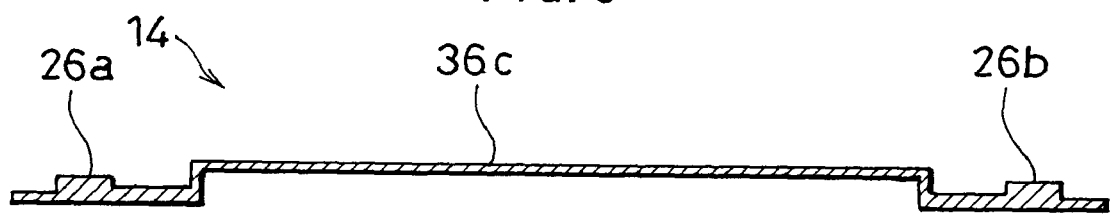
FIG. 8 is an end view taken along line E-E in FIG. 2.

In addition, the female engaging portions 29a and 29b projecting inward relative to the racks 26a and 26b at the sliding door 23 project out to engage with the male engaging portions 22a and 22b for purposes of positioning when the shaft is temporarily held onto the sliding door. As shown in FIGS. 7 and 8, the indented flat surface portions and the protruding flat surface portions are disposed in a staggered pattern over almost the entire sliding door 23. Namely, the indented flat surface portions (indented portions in FIG. 2) with rectangular surface areas include indented flat surface portions 35b and 35e with a significant longitudinal dimension disposed along the longitudinal direction over a central area, indented flat surface portions 35a and 35d with a smaller longitudinal dimension set along the longitudinal direction on one side of the indented flat surface portions 35b and 35e and indented flat surface portions 35c and 35f also with a smaller longitudinal dimension set along the longitudinal direction on the other side of the indented flat surface portions 35b and 35e. The indented flat surface portions 35a and 35c are each offset toward the center by a predetermined extent A along the longitudinal direction relative to the indented flat surface portion 35b and the indented flat surface portions 35d and 35f are each offset toward the center by the predetermined extent A along the longitudinal direction relative to the indented flat surface portion 35e. Thus, the indented flat surface portions are disposed by ensuring that they are in perfect alignment with one another. It is to be noted that the indented flat surface portions 35a, 35b and 35c together constitute a single lateral rib, whereas the indented flat surface portions 35d, 35e and 35f together form another lateral rib.

The protruding flat surface portions (the protruding portions in FIG. 2) formed over an area where the indented flat surface portions 35a through 35f are not present include a protruding flat surface portion 36c located at the center with a large lateral dimension, protruding flat surface portions 36a and 36d formed on one side of the protruding flat surface portion 36c and having a small longitudinal dimension and protruding flat surface portions 36b and 36e located on the other side of the protruding flat surface portion 36d along the lateral direction also having a small longitudinal dimension. The largest protruding flat surface portion 36c constitutes a large lateral rib. It is to be noted that the racks 26a and 26b are formed as recessed portions on the two sides of the sliding door 23 along the lateral direction and the female engaging portions 29a and 29b are formed to range from the recessed positions where the racks are present.

Longitudinal ribs 45a, 45b, 45c and 45d shown as narrow strips of protrusions are formed respectively between the indented flat surface portions 35a and 35b, between the indented flat surface portions 35b and 35c, between the indented flat surface portions 35d and 35e and between the indented flat surface portions 35e and 35f. The longitudinal ribs 45a and 45c are linearly continuous to each other, whereas the longitudinal ribs 45b and 45d are also linearly continuous to each other.

Since the sliding door 23 includes the longitudinal ribs and the lateral ribs ranging along the longitudinal direction and the lateral direction as described above, it achieves a specific level of strength against distortional force imparted along the longitudinal and lateral directions but it becomes bent readily along the diagonal direction (the directions along diagonals). Namely, it does not have a significant level of strength against torsional deformation and becomes bent readily by an external force. As a result, even if the air-conditioner case becomes deformed resulting in deformation of the guide grooves, the sliding door 23 can still move smoothly.

Figure 9:
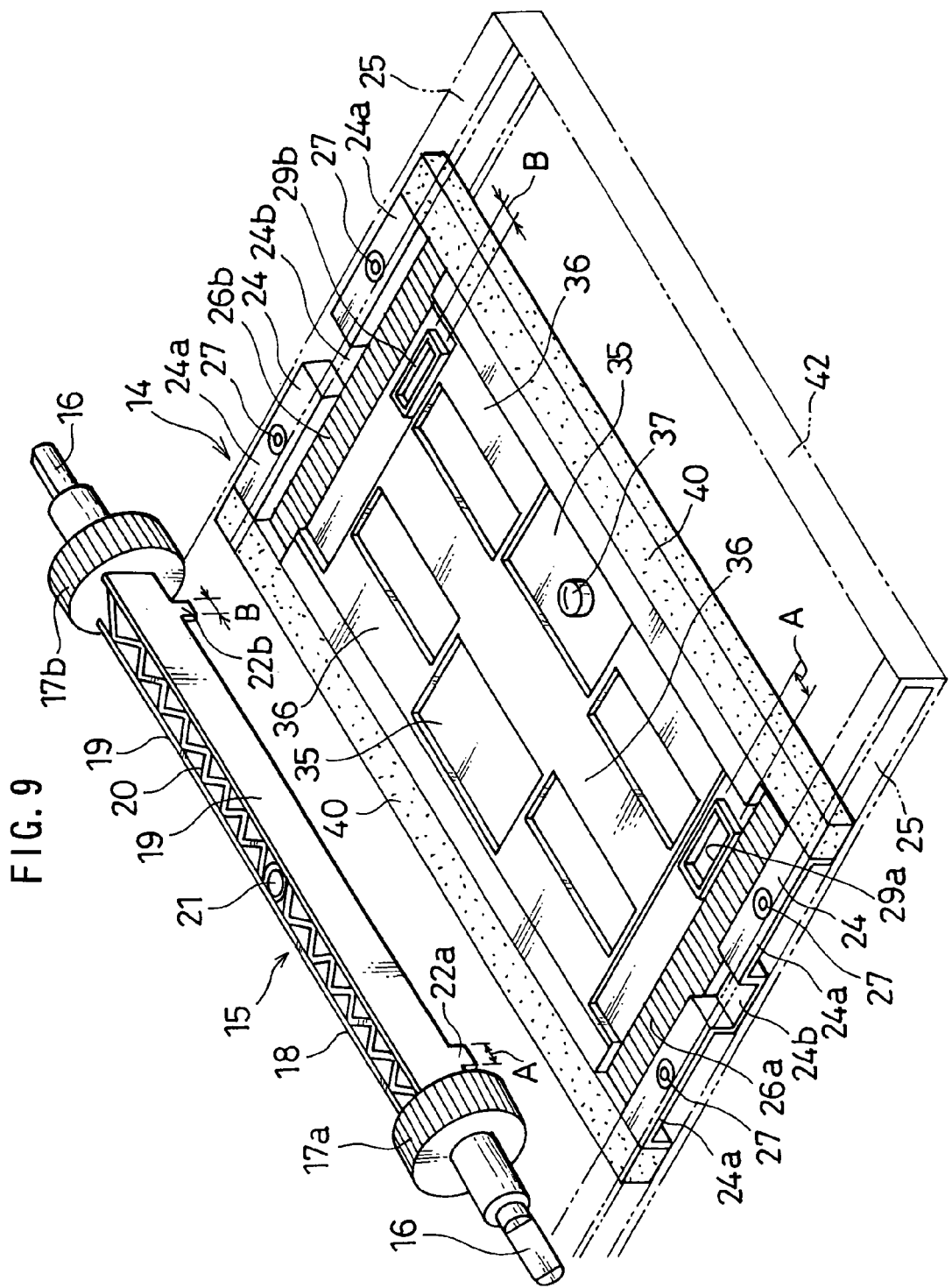
FIG. 9 is a perspective of the shaft disengaged from the sliding door.
Figure 10:
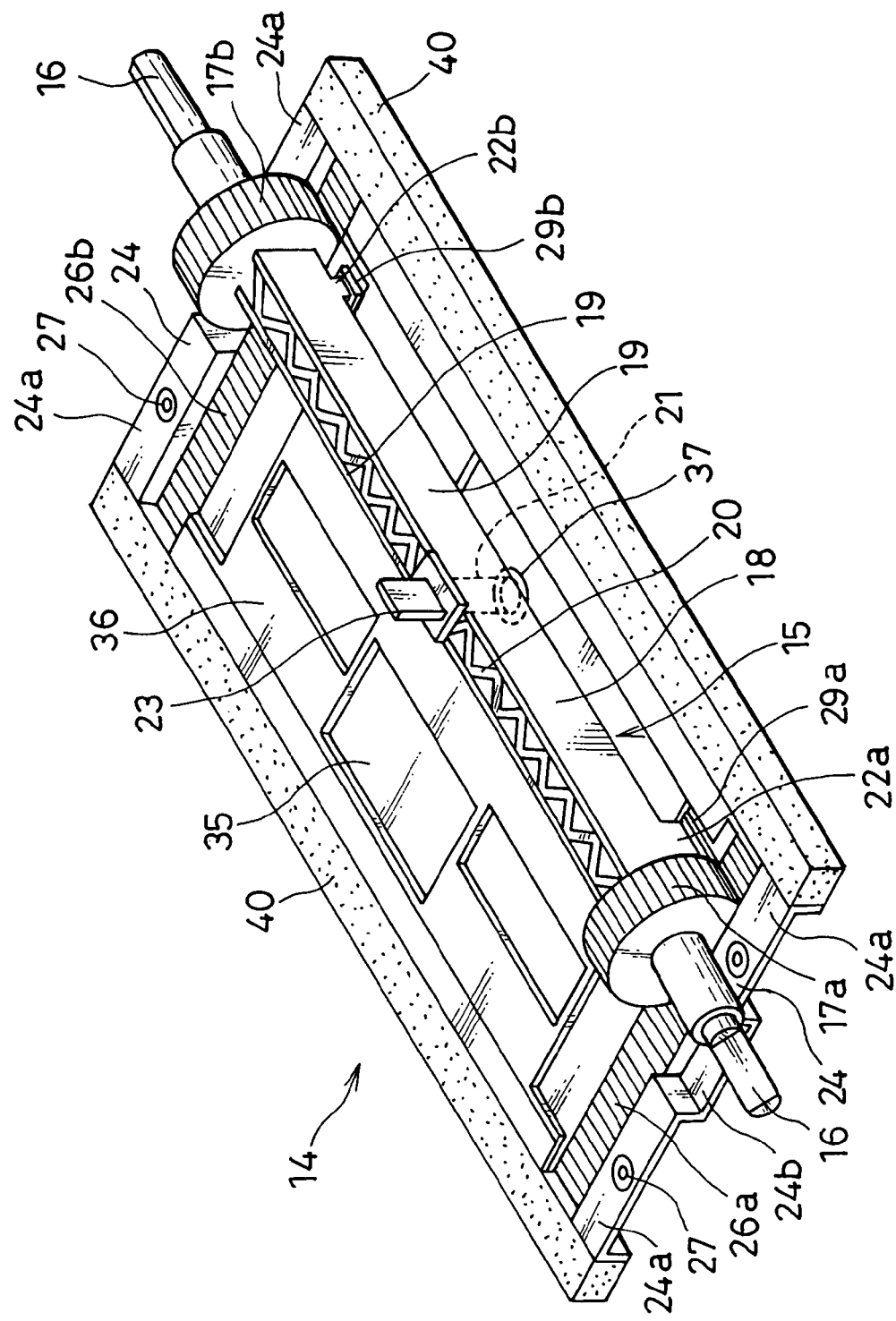
FIG. 10 is a perspective of the shaft temporarily held at the sliding door.

FIGS. 9 and 10 present another structural example which differs from the previous structural example in the following aspects. Namely, a bridge portion 18 extending between the pinions 17a and 17b at the shaft 15 in this embodiment is constituted with two elongated plates 19 and 19 facing opposite each other and connecting pieces 20 connecting the elongated plates to each other with a temporary holding pin insertion hole 21 formed at the center of the bridge portion and male engaging portions 22a and 22b formed near the pinions 17a and 17b respectively. One of the male engaging portions, i.e., the male engaging portion 22a, has a specific dimension A and the other male engaging portion 22b has a dimension B smaller than the dimension A.

Female engaging portions 29a and 29b, formed inward relative to the racks 26a and 26b at the sliding door 23, project out so as to engage with the male engaging portions 22a and 22b for purposes of positioning when the shaft is held temporarily onto the sliding door. One of the female engaging portions, i.e., the female engaging portion 29a, has the specific dimension A and the other female engaging portion 29b has a dimension B smaller than the dimension A. Indented flat surface portions 35 and protruding flat surface portions 36 are disposed in a staggered pattern over almost the entire sliding door 23. It is to be noted that reference numeral 37 indicates a hole formed at the sliding door 23 for purposes of temporarily holding the shaft.

When assembling the air-conditioner case 2, the shaft 15 is first temporarily held onto the sliding door 23 adopting the structure described above. Namely, the pinions 17a and 17b at the shaft are made to interlock with the racks 26a and 26b at the sliding door 23 and are rotated so as to engage the male engaging portions 22a and 22b with the female engaging portions 29a and 29b at the sliding door 23. Once the engaging portions are set in an engaged state, the positioning process is completed and as a holding pin 23 is inserted at the holding pin insertion hole 21, the front end of the pin projects out. The projecting portion of the pin is then inserted through the hole 37 at the sliding door 23. The shaft 15 thus becomes temporarily held onto the sliding door 23.

It is to be noted that since the dimension of the male engaging portion 22a and the female engaging portion 29a and the dimension of the male engaging portion 22b and the female engaging portion 29b are different from each other. This means that while the engaging portions 22a and 29a are allowed to engage with each other and the engaging portions 22b and 29b are allowed to engage with each other, the engaging portions 22a and 29b or the engaging portions 22b and 29a cannot engage with each other for positioning. Namely, since the holding pin 23 cannot be inserted through the insertion hole 21 and then through the hole 37, the assembly worker is able to recognize that the engaging portions are set in the wrong combination before the shaft and the sliding door are assembled erroneously.

Figure 11:
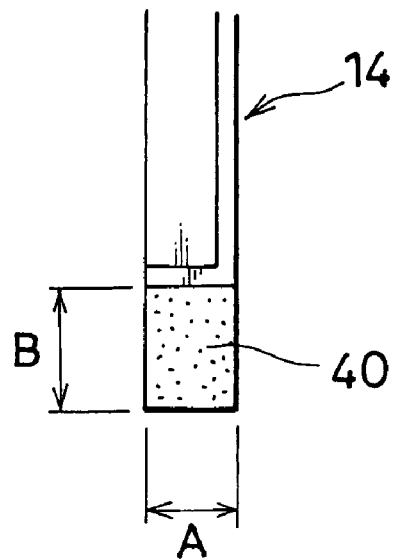
FIG. 11 is a side elevation of a seal member disposed at an end of the sliding door.
Figure 12:
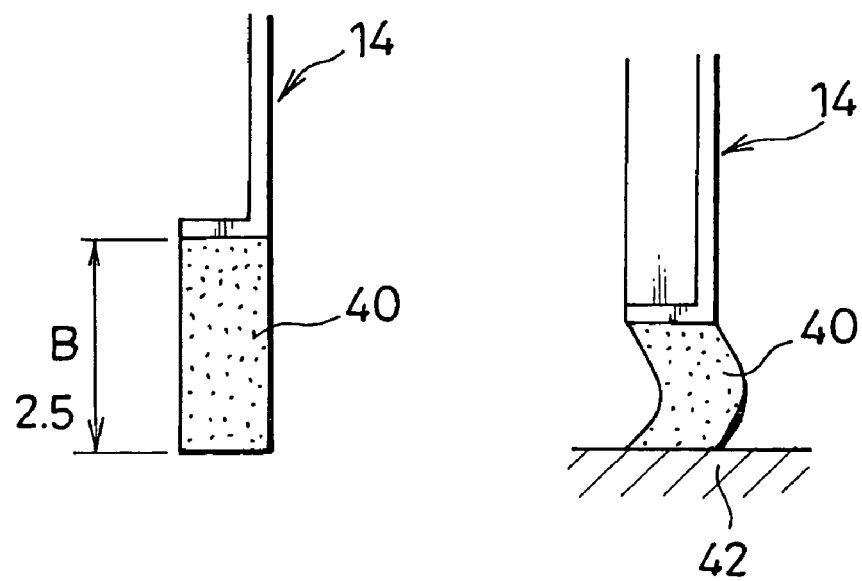
FIG. 12(a) is a side elevation of a seal member disposed at an end of the sliding door with the ratio of the lateral dimension thereof set at 2.5
FIG. 12(b) is a side elevation showing the seal member buckling as it is used for sealing.

FIG. 11 presents a specific example of a structure that may be adopted in the seal members 40 in FIG. 1. The seal members 40 formed by using a softer resin such as urethane and disposed at the two sliding ends of the sliding door 14 each come in contact with the contact portion 42 at the air-conditioner case 3 as the sliding door reaches a sliding end position through the guide grooves 25 and become compressed by the force of the movement of the sliding door. The seal members have a rectangular section and the ratio of their longitudinal dimension B to their lateral dimension A is set equal to or greater than 1 and equal to or less than 2. For instance, if their lateral dimension is 5 mm, their longitudinal dimension is equal to or greater than 5 mm and equal to or less than 10 mm. As long as seal members achieving such a ratio of the longitudinal dimension to the lateral dimension are used, a reliable seal with a sufficient seal margin is assured. If the ratio is, for instance, 2.5, as shown in FIG. 12(*a*), the seal members 40 may buckle, as shown in FIG. 12(*b*) due to the force of the pressure imparted as they come into contact with the contact portion. In such a case, an airtight seal cannot be achieved, which gives rise to the problem of air leakage.

Figure 13:
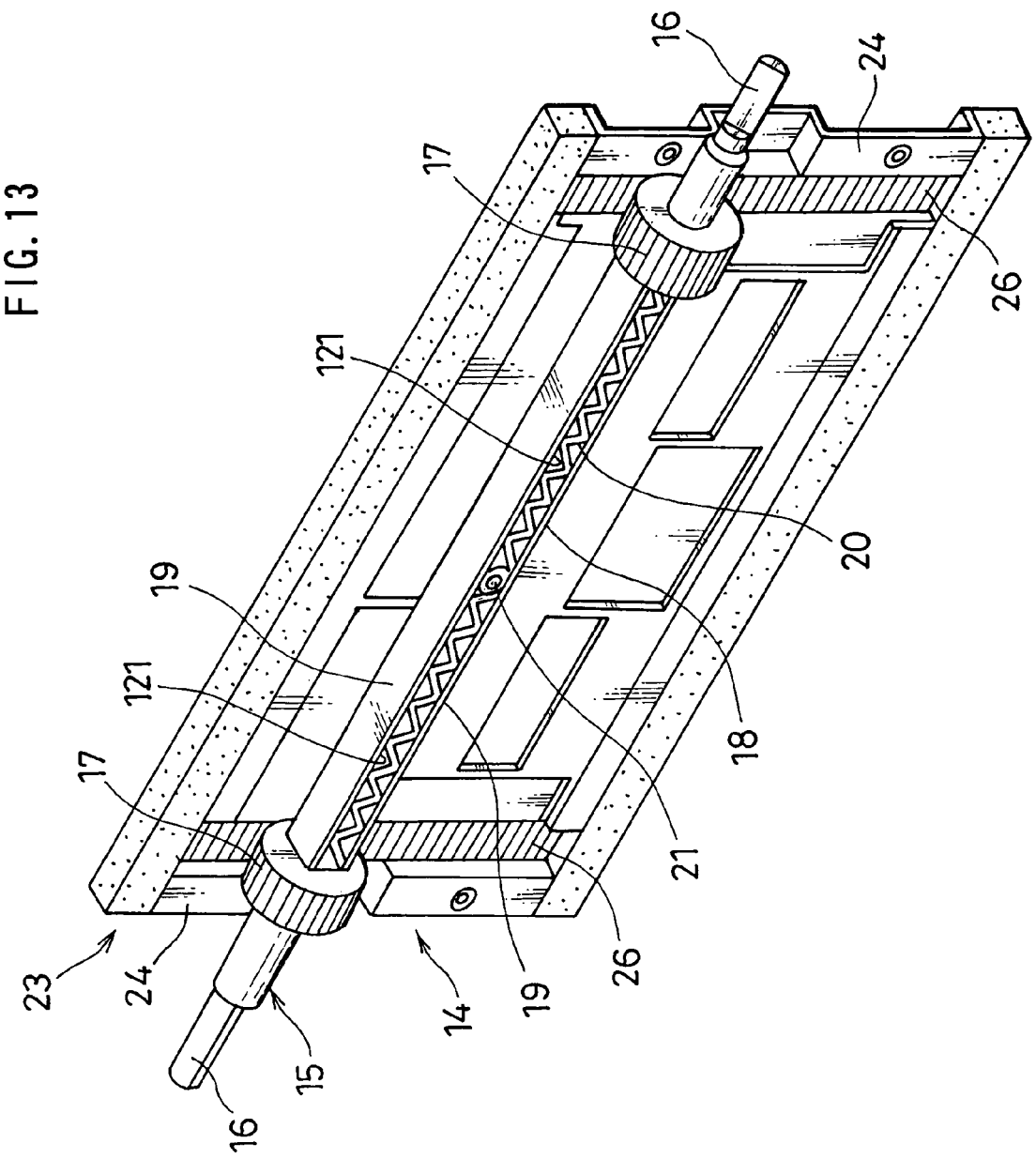
FIG. 13 shows the structures adopted in the sliding door and the shaft of a sliding door device for an air-conditioning unit according to the present invention.

The sliding door device adopting another structure shown in FIG. 13 primarily comprises a shaft 15 and a sliding door 23. The shaft 15 is formed as an integrated unit constituted of, for instance, a synthetic resin and is rotatably set so as to bridge the side walls of the air flow path 2 in the air-conditioner case 3, as shown in FIG. 13. As shown in the figure, axially supported portions 16 each to be axially supported at one of the side surfaces of the air flow path 2 are formed at the two ends of the shaft with disk-shaped pinions 17 and 17 each having numerous teeth formed inward relative to the axially supported portions 16.

In this embodiment, a bridge portion 18 extending between the pinions 17 and 17 at the shaft 15 is constituted with two elongated plates 19 and 19 facing opposite each other and connecting pieces 20 that connect the two elongated plates to each other, with the ventilating passage 121 formed between the individual connecting pieces 20 or between the connecting pieces 20 and the elongated plates 19. At the center of the bridge portion 18 along the lengthwise direction, a temporary holding pin insertion hole 21 extending along the shorter side of the bridge portion 18 is formed and by inserting a pin through the temporary holding pin insertion hole 21 and then further inserting the pin through a temporary holding pin hole (not shown) at the sliding door 23, the shaft 15 can be temporarily held onto the sliding door 23.

The sliding door 23 in the embodiment assumes a substantially flat plate shape. Sliding units 24 and 24 disposed at the two ends of the sliding door along the lengthwise direction are slidably fitted inside guide grooves 25 formed at the air-conditioner case 3 in FIG. 1, as shown in FIG. 13. The sliding door 23 also includes racks 26 and 26 formed inward relative to the sliding units 24 and 24 to interlock with the pinions 17 and 17 mentioned above. This structure allows a rotational force applied to the shaft 15 to be communicated to the sliding door 23 via the pinions 17 and the racks 26, which will cause the sliding door 23 to slide along the length of the guide grooves 25 in a direction intersecting the air flow path 2.

Figure 14:
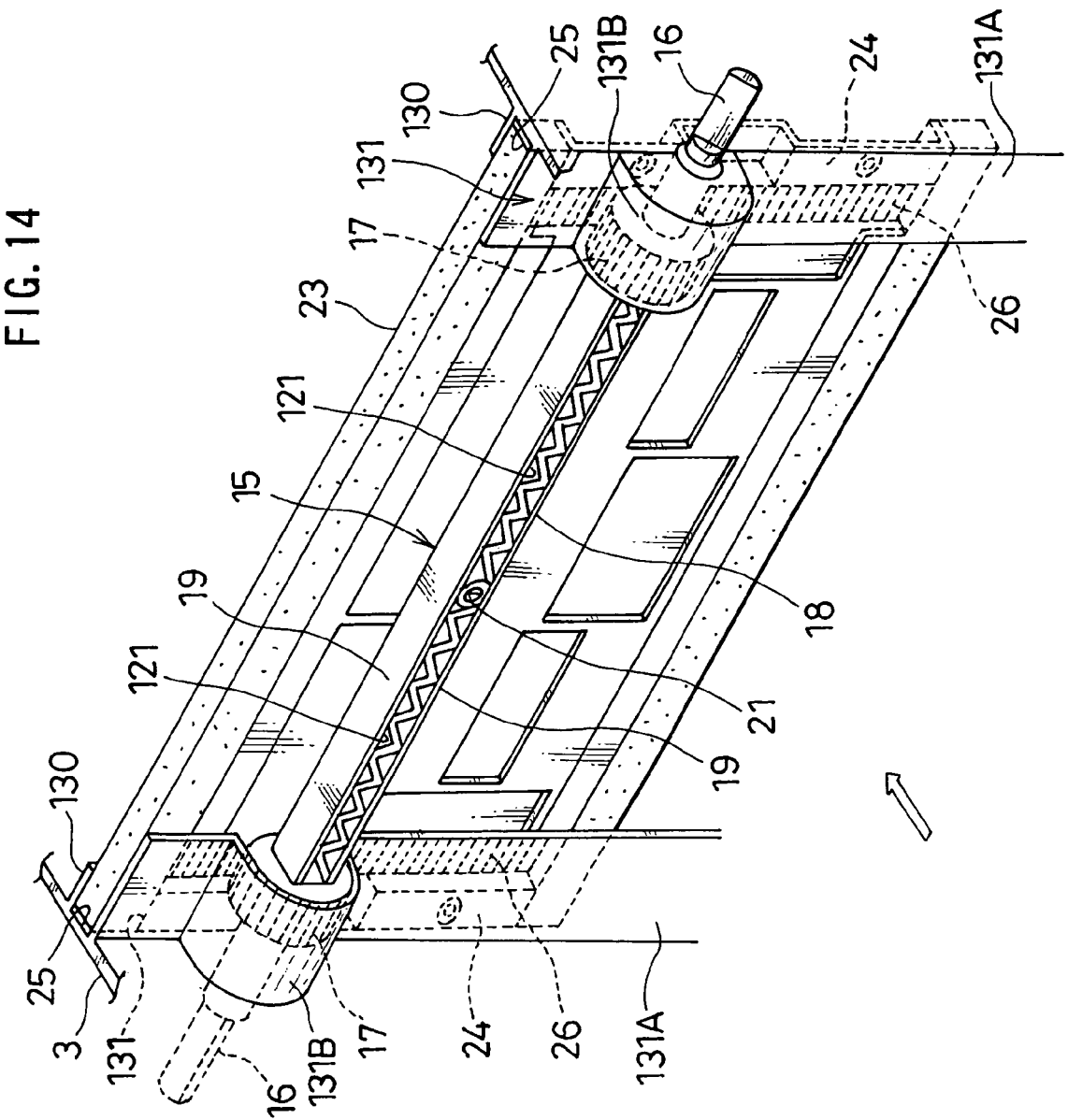
FIG. 14 shows how the cover members cover the pinions at the shaft and the racks at the sliding door as the sliding door device in FIG. 13 is mounted at the air-conditioner case.
Figure 15:
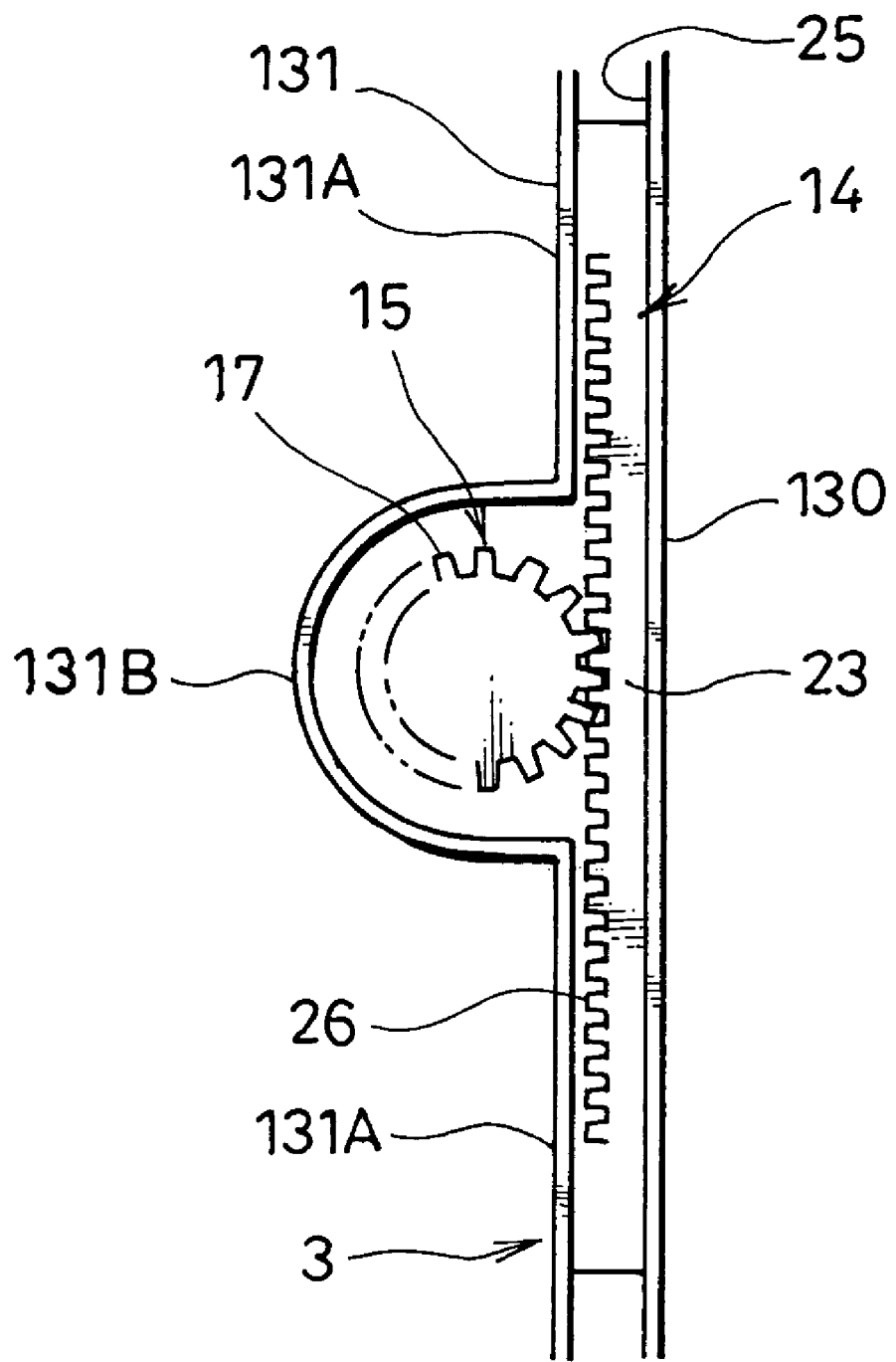
FIG. 15 is an enlargement showing a cover member in FIG. 14 covering a pinion at the shaft and a rack at the sliding door.

As shown in FIGS. 14 and 15, the guide members 130 used to prevent the sliding doors 23 from sliding off or tilting toward the downwind side are formed as integrated parts of the air-conditioner case 3 as upright walls projecting out from the guide grooves 25 on the downwind side of their edges along the lengthwise direction. In addition, cover members 131 are formed as integrated parts of the air-conditioner case 3 so as to project out on the upstream side at the edges of the guide grooves 25 along the lengthwise direction.

The cover members 131 are provided to prevent the sliding door 23 from sliding off or tilting toward the upwind side and also to cover the pinions 17 and the racks 26. Namely, the cover members 131 each constitute a flat portion 131A extending as a flat member substantially along the surface of the sliding door 23 over an area where a pinion 17 and the corresponding rack 26 do not interlock with each other and each constitute a semicylindrical portion 131B with a bottom, which extends along the axis of the shaft 15 while curving toward the upwind side substantially along the circumferential surface of the pinion 17 over an area where the pinion 17 and the rack 26 interlock with each other. The flat portions 131A and the semicylindrical portions 131B both extend inward relative to the pinions 17 and the racks 26.

In addition, the flat portions 131A and the semicylindrical portions 131B constituting the cover members 131 as well as the guide members 130 are made to extend along the direction matching the direction in which the walls 3A, 3B and 3C (see FIG. 1) defining the air flow path 2 in the air-conditioner case 3 extend.

In the structure described above, the air forced from the upwind side is blocked by the cover members 31 and thus does not reach the pinions 17 and the racks 26. As a result, foreign matter such as dirt and dust primarily contained in the air taken in through the outside air intake port is not allowed to collect at the recessed areas between the teeth at the pinions 17 and the racks 26, thereby effectively preventing such foreign matter from becoming stuck between the racks 26 at the sliding door 23 and the pinions 17 at the shaft 15.

In addition, although not shown, if the air-conditioner case 3 is constituted with a plurality of case members that can be separated along the longitudinal direction, the guide members 130 and the cover members 131 can be formed concurrently through die cutting while the walls 3A, 3B and 3C are formed. In such a case, the manufacturing cost of the air-conditioner case 3 can be lowered compared to the manufacturing cost of an air-conditioner case having the guide members 130 and the cover members 131 formed as separate members.

Figure 16:
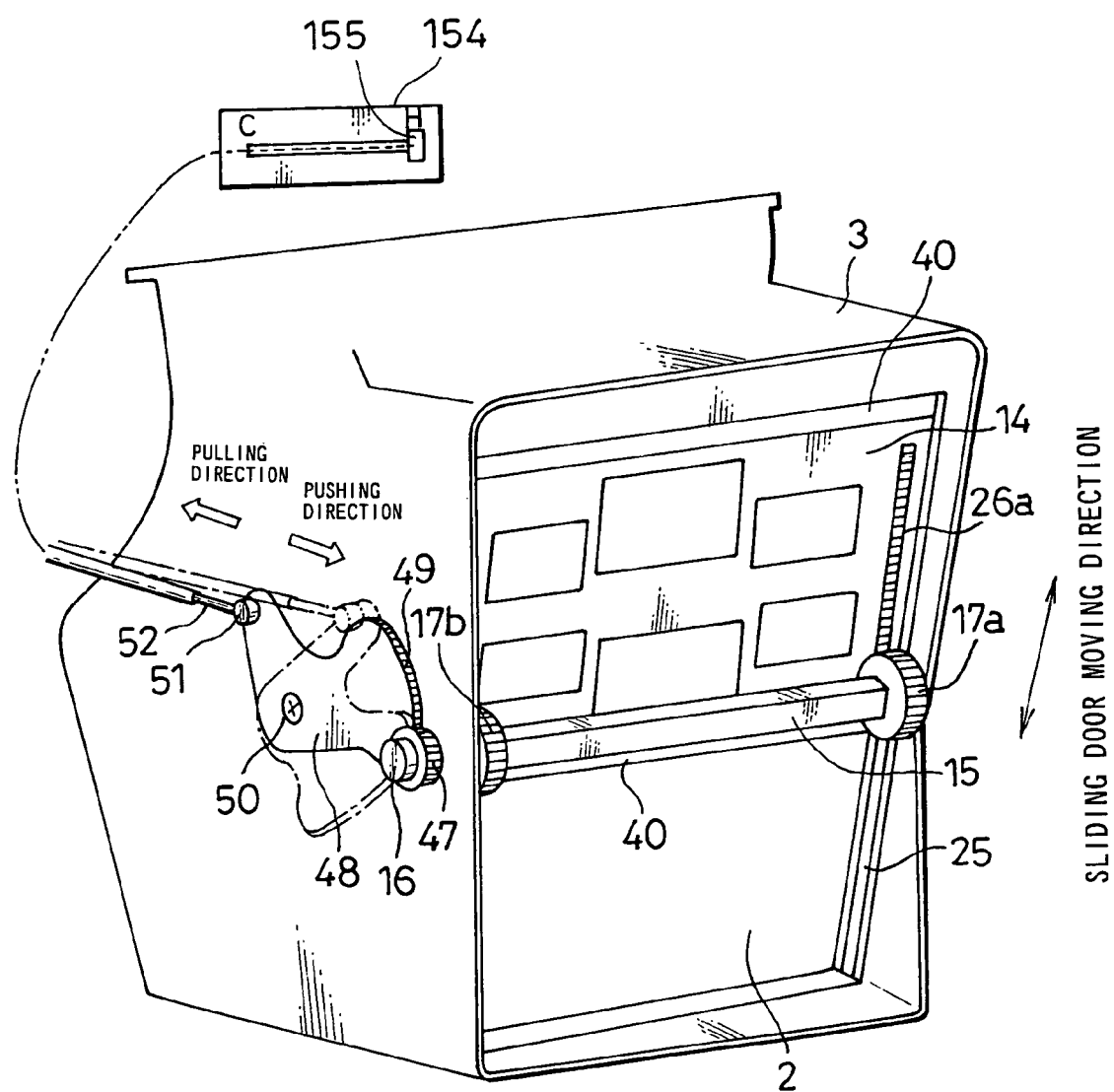
FIG. 16 is a perspective of the air-conditioner case, which includes a sliding door drive system engaged in drive of the sliding door for an automotive air-conditioning system according to the present invention.

As shown in FIG. 16, the axially supported portions 16 at the shaft 14 project out on the outside of the air-conditioner case 3, with a pinion 47 mounted at each projecting end of the shaft 14 in the sliding door device. The pinion 47 interlock with a gear disposed at one end of a drive lever 48. At the other end of the drive lever 48 rotatable around the fulcrum set at an axis 50, a pin 51 connected with one end of a cable 52 to be detailed below projects out.

The other end of the cable 52 is connected to a lever 155 at an operation device 154. The operation device 154 is operated to set the temperature of the outlet air, and as the outlet air temperature is selected by moving the lever 155, the sliding door 23 is caused to move in the vertical direction in correspondence to the selected temperature setting.

In the sliding door device 23 structured as described above, the operational force (the force imparted as the lever 55 is manually moved to the left/right) from the operation device 154 is transmitted via the cable 52 to the drive lever 48, thereby causing the drive lever 48 to rotate around the fulcrum at the axis 50. Namely, as an operational force along the pulling direction is applied to the cable 52, the drive lever 48 is caused to rotate along direction A around the fulcrum at the axis 50 as schematically illustrated in FIG. 17. Then, the pinions 47 interlocking with the gear 49 rotates along direction D, which causes the shaft 15, too, to rotate along the same direction.

As a result, the pinions 17a and 17b are also caused to rotate along the same direction, thereby moving the sliding door 23 upwards, i.e., along the direction in which gravity is at work (against gravity). The cable 52 is invariably operated along the pulling direction to move the sliding door 23 upward. Thus, the flexible cable does not buckle.

If, on the other hand, an operational force along the pushing direction is applied to the cable 52, the drive lever 48 is caused to rotate along direction B, i.e., along the opposite direction from direction A around the fulcrum at the axis 50, as shown in FIG. 17. Consequently, the pinions 47 interlocking with the gears 49 rotates along direction C, which causes the shaft 15, too, to rotate along the same direction.

As a result, the pinions 17a and 17b are also caused to rotate along the same direction, thereby moving the sliding door 23 downwards, i.e., along the direction of gravity. The cable 52 is invariably operated along the pushing direction to move the sliding door 23 downward. Consequently, even when an operational force along the pushing direction is applied to the cable, the deadweight of the door prevents the cable 52 from buckling.

As described above, since its own deadweight is always at work in the cable, the play of the cable is reduced, which, in turn, reduces the extent of cable hissing. It is to be noted that while the guide grooves 25 through which the sliding door 23 is guided extend along the vertical direction in this embodiment, the term "vertical direction" in this context is not used in the strict sense but simply to refer to the direction along which gravity is at work, including diagonal directions.

Figure 19:
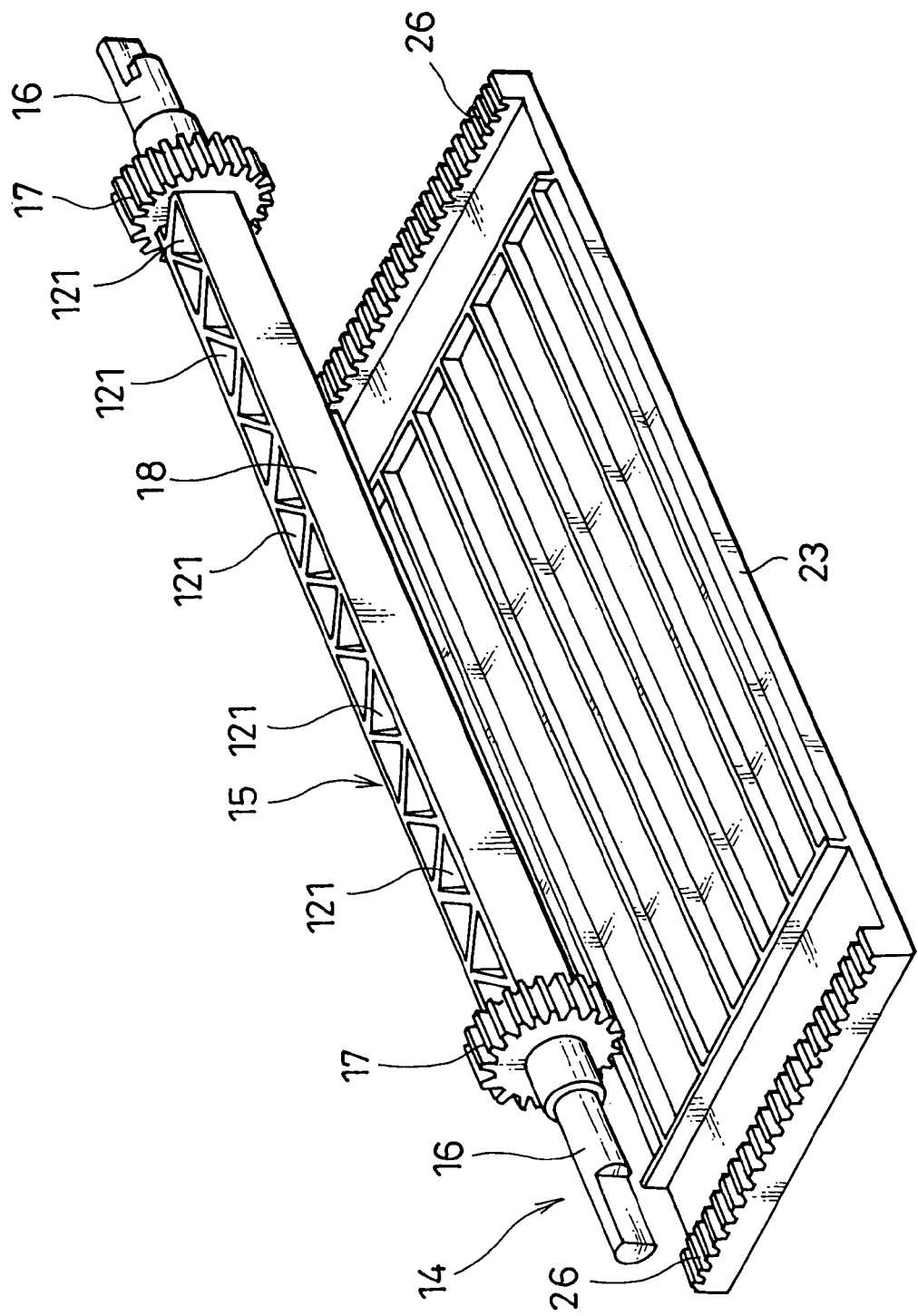
FIG. 19 is a perspective showing the structures adopted in the shaft and the door main unit.

FIG. 18 presents another structural example that may be adopted in the shaft at the sliding door device. The sliding door device 14 primarily comprises a shaft 15 and a sliding door 23. The shaft 15 is formed as an integrated unit constituted of, for instance, a synthetic resin and is rotatably set so as to bridge the side surfaces of the air flow path 2 in the air-conditioner case 3. As shown in FIGS. 18(a), 18(b) and 19, axially supported portions 16 each to be axially supported at one of the side surfaces of the air flow path 2 are formed at the two ends of the shaft 15 with disk-shaped pinions 17 each having numerous teeth formed inward relative to the axially supported portions 16. The distance between the pinions 17 and 17 is set to correspond to the distance between the racks 26 and 26 at the sliding door 23 to be detailed later. In addition, the shaft 15 includes a bridge portion 18 extending between the pinions 17 and 17.

As shown in FIG. 19, the sliding door 23 in this embodiment assumes the shape of a substantially flat plate and includes the racks 26 and 26 to interlock with the pinions 17 at the shaft 15, which are formed at the two ends thereof along the lengthwise direction. The dimensions of the racks 26 are set so that as the pinions 17 move to the ends of the racks 26 on one side, the sliding door 23 completely blocks a branch flow path 2a, thereby creating a full heating state, whereas as the pinions 17 move to the ends of the racks 26 on the other side, the sliding door 23 fully blocks a branch flow path 2b, thereby creating a full cooling state.

In addition, as shown in FIG. 1, the edges of the sliding door 23 on the two sides slidably engage the groove portions 25 formed at the side surfaces of the air flow path 2. Thus, a rotational force applied to the shaft 15 is transmitted to the sliding door 23 via the pinions 17 and the racks 24 causing the sliding door 23 to slide along the length of the grooves 25 so as to intersect the air flow path 2.

As shown in FIG. 18, the bridge portion 18 of the shaft 15 assumes a narrow substantially rectangular parallelopiped shape extending along the axial direction. A plurality of ventilating passage 121 are formed to open on the two sides of a pair of surfaces of the rectangular parallelopiped facing opposite each other. The ventilating passages 121, viewed from an open side, assume a substantially triangular shape and the triangular openings defined by the edges between adjacent ventilating passage 121 are alternately set to point upward and downward in the embodiment. By forming and arranging the ventilating passage 121 as described above at the bridge portion 18, a required level of strength is assured for the bridge portion 18 despite the presence of the plurality of ventilating passage 121 at the bridge portion 18.

However, the bridge portion 18 at the shaft 15 may adopt a structure other than that in the embodiment, as long as ventilating passage 121 can be formed while assuring the required level of strength at the bridge portion 18. For instance, the bridge portion 18 may be a cylindrical member, or the openings of the ventilating passage 121 may be quadrangular or circular. With such ventilating passage 121 formed at the bridge portion 18, the entire shaft 15 can be provided as a lightweight unit.

The pinions 17 at the shaft 15 and the racks 24 at the sliding door 23 are made to interlock with each other so that as the sliding door 23 slides relative to the shaft 15 to a sliding end position, the ventilating passage 121 at the shaft 15 are set parallel to the surface of the sliding door 23 where the racks are formed.

Figure 20A:
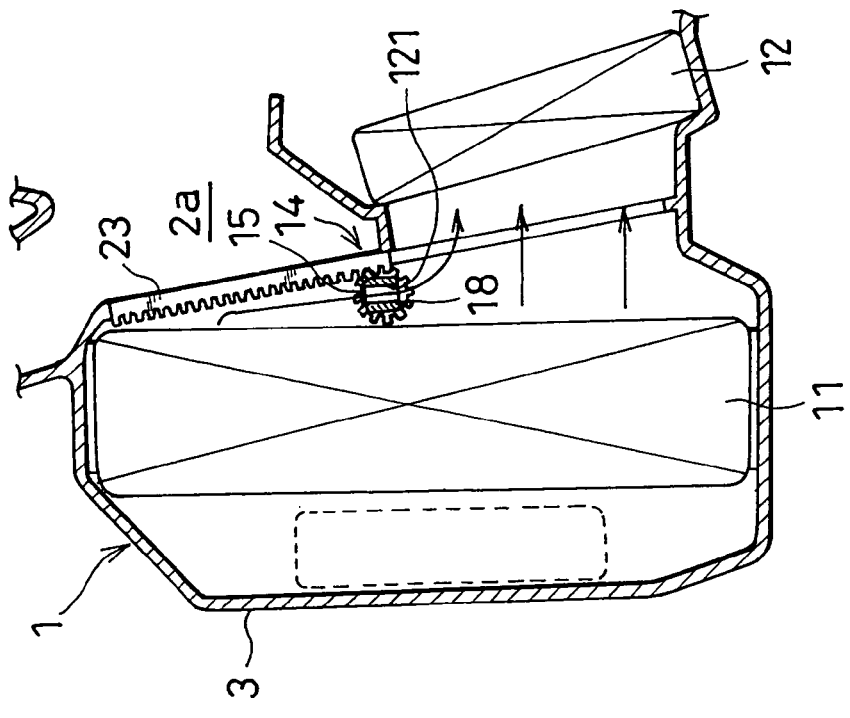
FIG. 20(a) illustrates the air flow during a full cooling operation and FIG. 20(b) illustrates the air flow during a full heating operation.
Figure 20B:
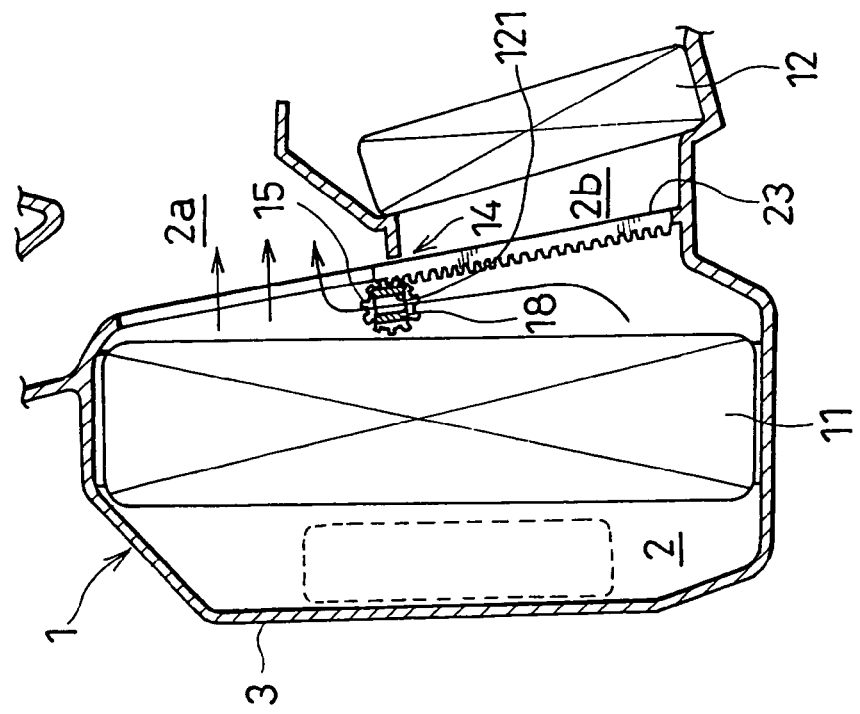
Figure 21:
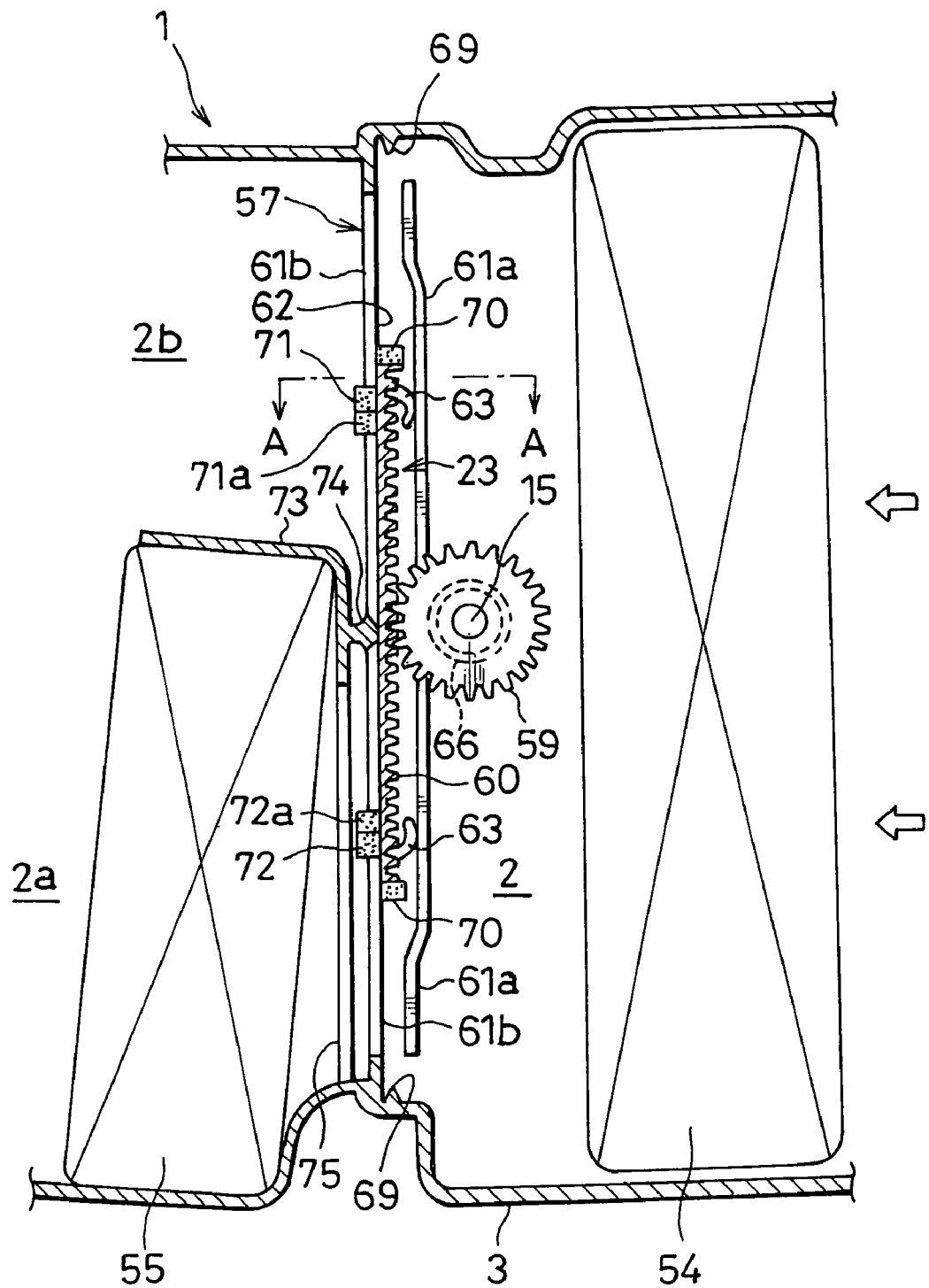
FIG. 21 is a sectional view presenting an example of a structure that may be adopted in an automotive air-conditioning system that includes a sliding door device according to the present invention.

In the full cooling state, the branch flow path 2b is completely blocked off by the sliding door 23 and, as a result, air having flowed toward the downstream side by passing through the area of the evaporator 11 facing opposite the sliding door 23 passes through the ventilating passage 121 formed at the bridge portion 18 of the shaft 15 located in the middle of the air flow while it flows along the surface of the sliding door 23 where the racks are formed toward the branch flow path 2a, as shown in FIG. 20(a). In contrast, in the full heating state, the branch flow path 2a is completely blocked off by the sliding door 23 and, as a result, air having flowed toward the downstream side by passing through the area of the evaporator 11 facing opposite the sliding door 23 passes through the ventilating passage 121 formed at the bridge portion 18 of the shaft 15 located in the middle of the air flow while it flows along the surface of the sliding door 23 where the racks are formed toward the branch flow path 2b, as shown in FIG. 20(b).

In this structure, the bridge portion 18 at the shaft 15 does not create any air flow resistance, which allows the evaporator 11 and the sliding door device 14 to be disposed even closer to each other. This ultimately makes it possible to provide the air-conditioner unit 1 as a more compact unit.

FIGS. 21 through 31 present examples of alternative structures that may be adopted in the air mix door device for an air-conditioning system. An automotive air-conditioning system 1 in FIG. 21 includes an air-conditioner case 3 having an air flow path 2 formed therein. Air is fed from a blower fan (not shown) disposed on the upstream side relative to the air-conditioner case 3 and on the downstream side relative to the air-conditioner case 3, mode doors (not shown) used to distribute the temperature controlled air to outlet ports selected in correspondence to a specific outlet mode and the like are disposed.

An evaporator 54 set upright so as to block the entirety of the air flow path 2, through which all the air taken into the air-conditioner case 3 is to pass, is disposed on the downstream side of the blower fan. In addition, a heater core 55 set so as to partially block the air flow path 2 is disposed downstream of the evaporator 54. The evaporator 54, which is connected through piping with a compressor, a condenser, an expansion valve and the like (not shown) to constitute a cooling cycle, cools air passing through the evaporator 54 with a coolant supplied via the compressor. In addition, air passing through the heater core 55 is heated with engine cooling water supplied to the heater core 55.

A sliding door 23, which slides along a direction intersecting the air flow path 2, and adjusts the ratio of the quantity of air to flow through a branch flow path 2a passing through the heater core 55 and the quantity of air to flow through a branch flow path 2b bypassing the heater core 55 is disposed in a space between the evaporator 54 and the heater core 55 at a position that is downstream of the evaporator 54 and upstream of the heater core 55.

Figure 22:
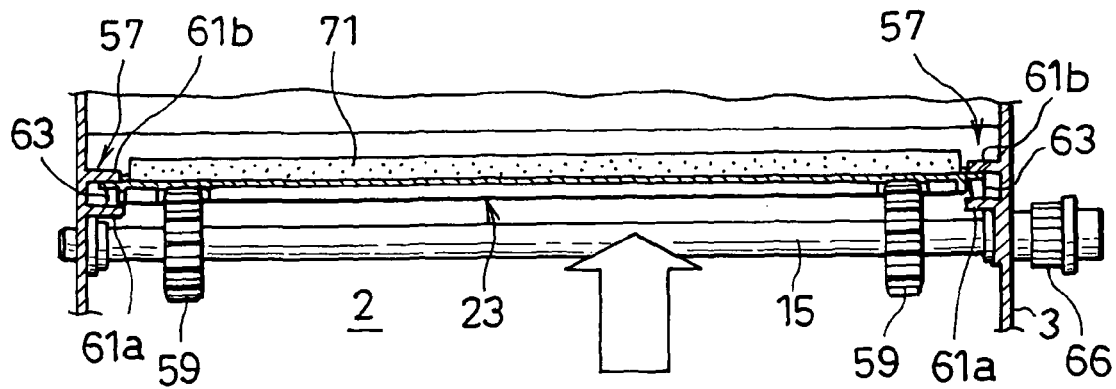
FIG. 22 shows the sliding door device in FIG. 21 viewed from above in a sectional view taken across line A-A in FIG. 1.
Figure 23:
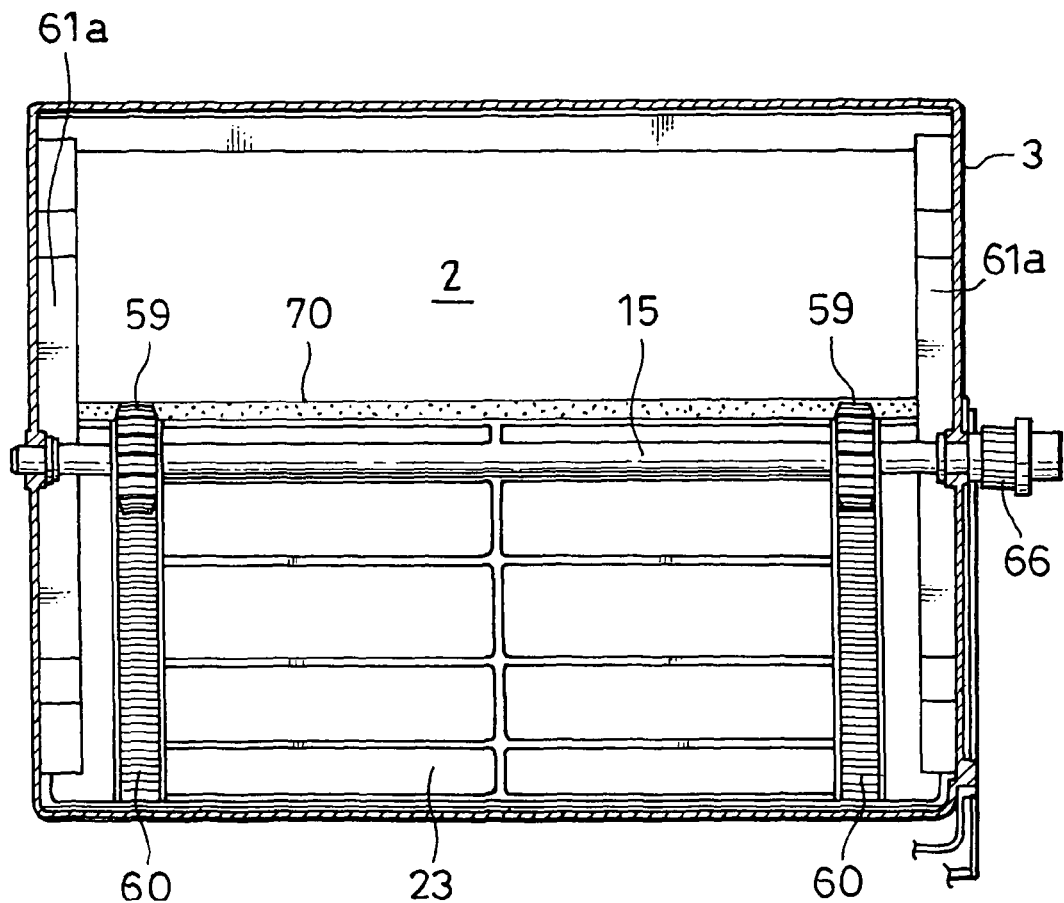
FIG. 23 shows the sliding door device in FIG. 21 viewed from the upstream side.
Figure 24:
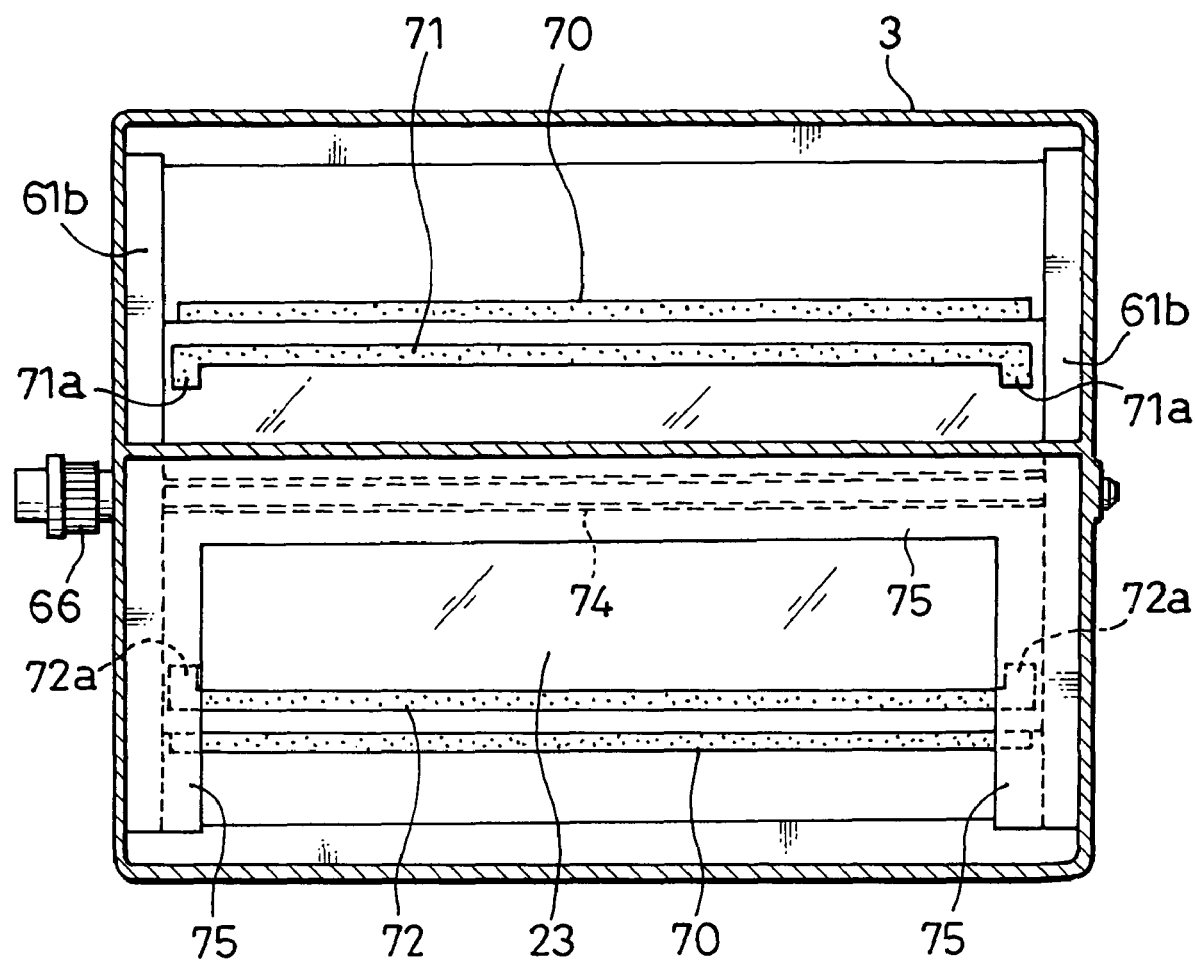
FIG. 24 shows the sliding door device in FIG. 21 viewed from the downstream side.

As shown in FIGS. 22 through 24, the sliding door 23 is constituted with a rectangular plate, with the lateral dimension thereof set substantially equal to the distance between the side walls of the air-conditioner case 3 facing opposite each other along the lateral direction and the longitudinal (vertical) dimension thereof set so that when one of the branch flow paths is blocked, the other branch flow path becomes fully open.

In addition, the sliding door 23 slides as it is guided through a pair of guide portions 57 extending along the vertical (longitudinal) direction, which are formed at the side surfaces of the air-conditioner case 3 facing opposite each other. In this embodiment, the guide portions 57 are each constituted as a guide groove at which a side edge of the sliding door 23 is slidably inserted. In addition, racks 60 to interlock with drive gears 59 to be detailed below are formed at the sliding door 56 substantially over the full range along the vertical (longitudinal) direction at the surface of the sliding door located on the upwind side.

Figure 25:
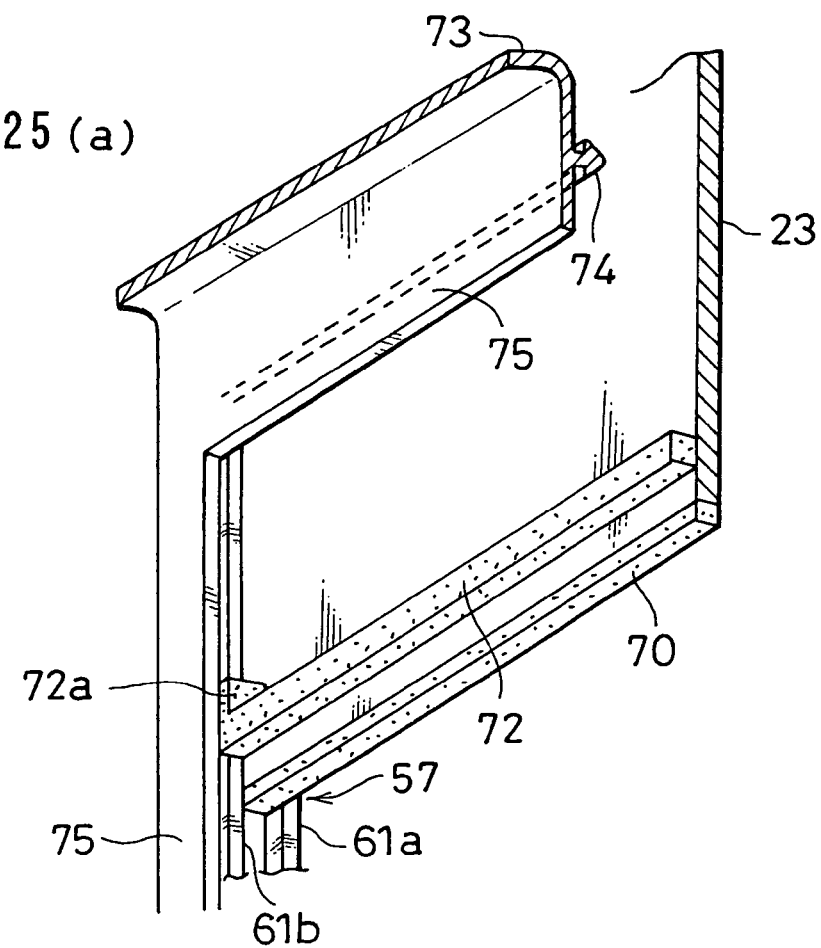
FIG. 25 presents perspectives of the area where the sliding door device in FIG. 21 is mounted, viewed from the downstream side with FIG. 25(a) showing the seal member 72 separated from the contact portion 74 and FIG. 25(b) showing the seal member 72 in contact with the contact portion 74.
Figure 25:
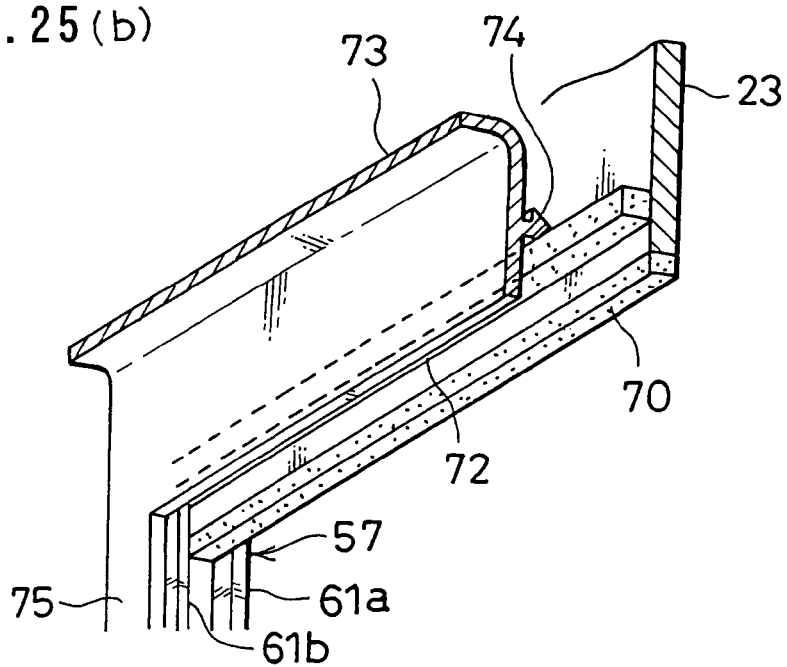
Figure 26A:
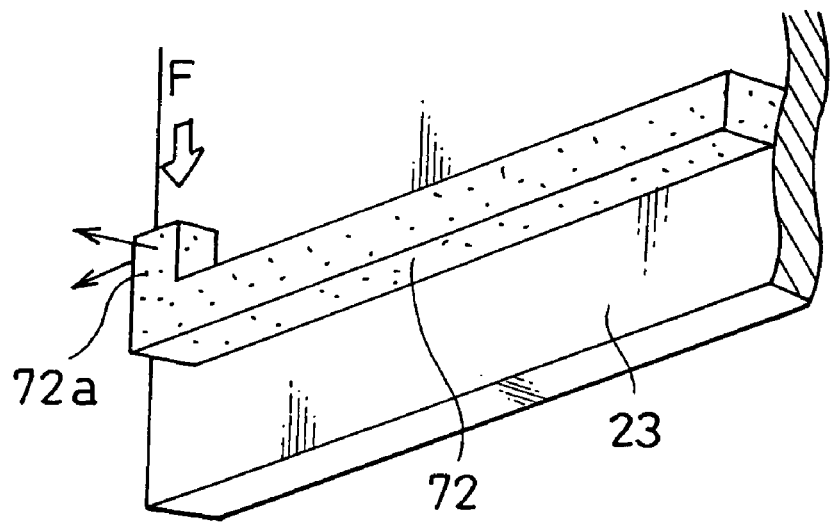
FIG. 26(a) is a perspective of an area of the sliding door over which the seal member is disposed.
Figure 26B:
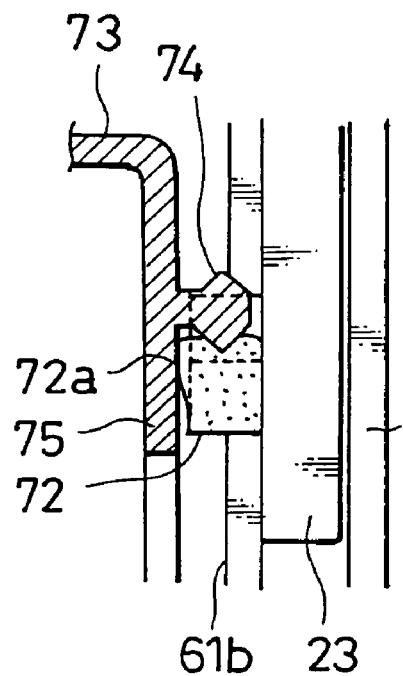
FIG. 26(b) is a sectional view of the seal member at the sliding door pressed against the contact portion from a side and FIG. 26(c) is a sectional view of the seal member at the sliding door pressed against the contact portion from above.
Figure 26C:
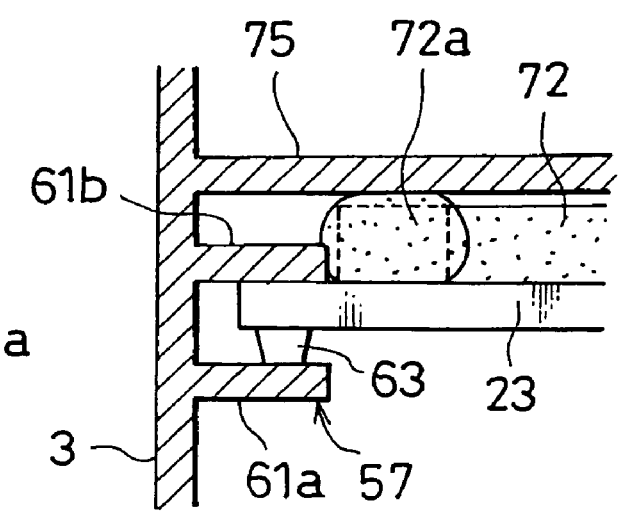

As shown in FIGS. 25 and 26, the guide portions 57 constituted as guide grooves each include a pair of guide ribs 61a and 61b projecting out into the air flow path 2 from the inner wall of the air-conditioner case 3. At the guide rib 61b on the downwind side, a flat surface facing opposite the guide rib 61a on the upstream side is formed over its entirety, constituting a seat surface 62 with which the sliding door 23 achieves slidable contact. In addition, arm-like elastic portions 63, which press the sliding door 23 against the seat surfaces 62 are formed at the side edges of the sliding door 23 inserted in the guide grooves.

A drive shaft 15, bridging over the air-conditioner case 3 so as to horizontally extend along the plane of the sliding door 23 through a substantial center of the air flow path 2, is disposed between the evaporator 54 and the sliding door 23, and drive gears (pinions) 59 to interlock with the racks 60 at the sliding door 23 are fixed onto the drive shaft 15. At a portion of the drive shaft 15 projecting on the outside of the air-conditioner case 3, an outer gear 66 is fixed so as to interlock with a gear that is operated by interlocking with a temperature control lever (not shown) to receive a rotational motive force from the outside.

Thus, as the temperature control lever is operated to rotate the drive gears 59 via the outer gear 66 and the drive shaft 15, the sliding door 23, guided through the guide portions 57, slides along the vertical direction against the seat surfaces 62. Through this process, the ratio of the quantities of air to pass through the branch flow paths 2a and 2b is adjusted.

At the two ends of the sliding door 23 along the sliding direction, seal members 70 extending along the lateral direction without contacting the inner walls of the air-conditioner case 3 are disposed. At a sliding end position to which the sliding door 23 slides through the guide grooves, the sliding door 73 is made to contact pointed contact portions 69 formed at the air-conditioner case 3 via the seal member 70.

Near the two ends of the sliding door 73* along the sliding direction, seal member is 71 and 72 extending along the lateral direction or disposed at the surface of the sliding door 73* on the downwind side. The seal members 71 and 72 come into contact along the sliding direction with a contact portion 74 constituted with the front end of a barrier wall 73, which defines the space housing the heater core 55 and also defines the boundary between the branch flow path 2a and the branch flow path 2b. Namely, when the sliding door 23 assumes the full heating position at which the branch flow path 2b is blocked and the branch flow path 2a is fully opened, the lower seal member 72 presses against the contact portion 74 from below, whereas when the sliding door 23 assumes the full cooling position at which the branch flow path 2a used blocked and the branch flow path 2b is fully opened, the upper seal member 71 presses against the contact portion 74 from above.

The ends of the upper and lower seal members 71 and 72 on the two sides are set in close proximity to the inner walls of the air-conditioner case 3, i.e., in close proximity to the downwind-side guide ribs 61b in this example. In addition, the end portions of the lower seal member 72 are set between the downwind-side guide ribs 61b and wall portions 75 ranging parallel to the guide ribs 61b and projecting toward the branch flow path 2a by an extent greater than that of the guide ribs 61b so as to face opposite the downwind-side surface of the sliding door 73.

At the ends of the seal members 71 and 72 on the two sides, deformable bumps 71a and 72a are respectively formed as integrated parts thereof. The deformable bumps 71a and 72a are each formed as a pressure-responsive deformation portion which projects out toward the contact portion 74 along the sliding direction and becomes elastically deformed along the direction intersecting the sliding direction as it is pressed against the contact portion 74. The deformable bumps 71a and 72a constitute part of the seal members 71 and 72 respectively, and when they are not elastically deformed, they are set slightly apart from the downstream side guide ribs 61b. The deformable bumps 72a at the lower seal member also face opposite the wall portions 75 over a slight distance from the wall portions 75 when they are not elastically deformed.

When the sliding door 23 slides the seal members 70, 71 and 72 disposed with a clearance from the guide ribs 61b and the wall portions 75 do not slide against the guide ribs 61b or the wall portions 75 in the structure described above. As a result, there is no friction of the seal members against the guide ribs or the wall portions, which assures a significant level of durability for the seal members 70, 71 and 72. In addition, no noise due to the friction of the seal members 70, 71 and 72 against the air-conditioner case 3 occurs and a smooth movement of the sliding door 23 is assured.

As the sliding door 23 moves to the full heating position at which the branch flow path 2b is blocked, the lower seal member 72 comes in contact with the contact portion 74 along the sliding direction, pressing the deformable bumps 72a at the two ends thereof hard against the contact portion 74. As a result, the compressive load (indicated by the unfilled arrow) F imparted from the contact portion 74 causes each deformable bumps 72a to distend through elastic deformation along the direction intersecting the sliding direction, as indicated by the line arrows in FIG. 26(*a*). The deformable bumps prior to the deformation indicated by the dotted lines in FIGS. 26(*b*) and 26(*c*) thus assumes the state indicated by the solid lines, in which they are pressed against the downwind-side guide ribs 61b and the surfaces of the wall portions 75, thereby sealing the area between the sliding door 23 and the air-conditioner case 3. As a result, a good seal between the sliding door 23 and the air-conditioner case 3 is assured whenever the sliding door 23 moves to a stop position.

It is to be noted that while the wall portions 25 are present only on the side of the branch flow path 2a in the structure described above, a wall portion to face opposite the sliding door 23 may also be disposed on the side toward the branch flow path 2b. In addition, while deformable bumps are only formed at the seal members that are pressed against the contact portion 74 formed at the front end of the barrier wall 73, similar deformable bumps may also be formed at other seal members.

Figure 27A:
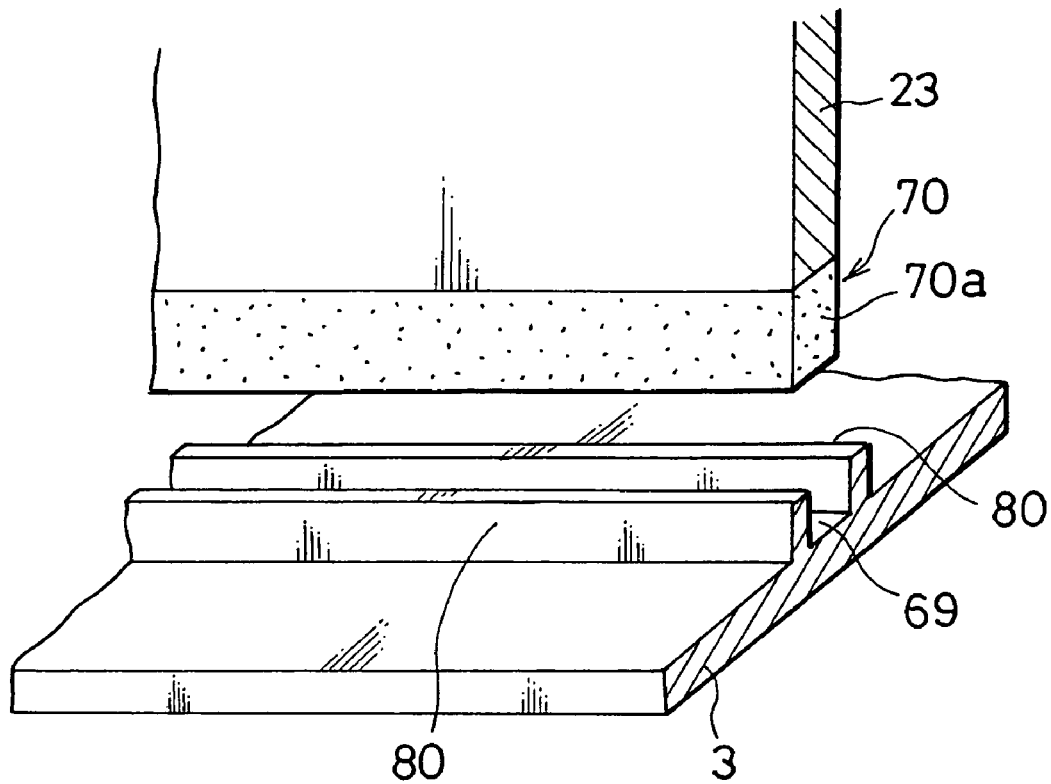
FIG. 27 shows the structure of the seal member disposed at an end of the sliding door device in FIG. 21 along the sliding direction, with FIG. 27(a) presenting a perspective of the seal member 22 separated from the contact portion and FIG. 27(b) showing the seal member 2 before and after it becomes pressed against the contact portion.
Figure 27B:
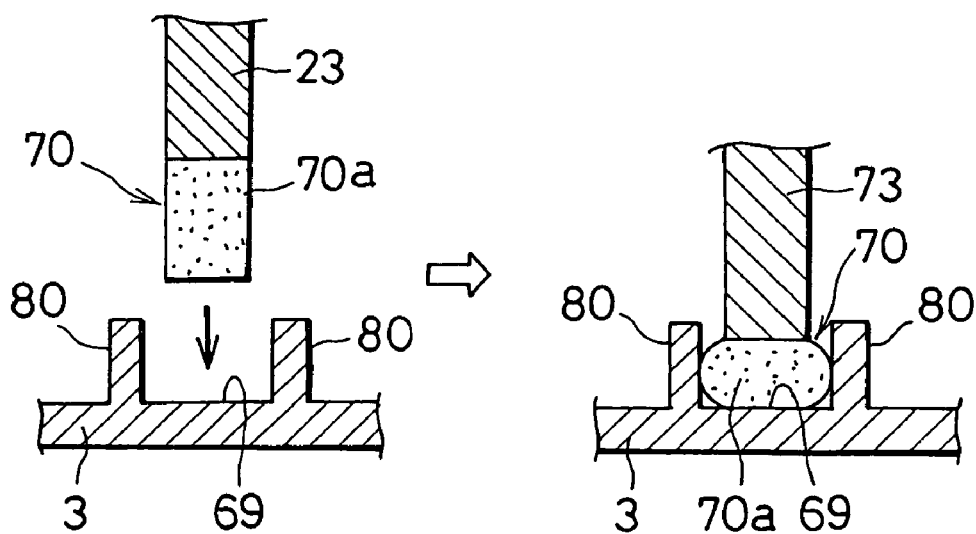

The seal members 70 at the ends of the sliding door 73 along the sliding direction and the contact portions 69 that come into contact with the seal members 70 may adopt structures shown in FIG. 27 instead of the structures described above or in conjunction with the structures described above. Namely, the contact portions 69 at the air-conditioner case may each be formed as a flat expanse with upright wall portions 80 formed to extend along the sliding direction over the length of the contact portion 69. The seal members 70 may each include a pressure-responsive deformation portion which becomes deformed along the direction different from the sliding direction to achieve close contact with the air-conditioner case 3 when it is pressed against the contact portion 69.

More specifically, the seal members 20 may each form a pressure-responsive deformation portion 70a with its entirety, and the wall portions 80 may be constituted with a pair of upright ribs extending along the contact portion 69 in the sliding direction in which the sliding door 23 slides. The seal member 70 formed at each end of the sliding door 23 may be inserted between the wall portions and pressed against the contact portions 69 to become elastically deformed along the direction perpendicular to the sliding direction so that the sides of the seal member 70 come into close contact with the inner surfaces of the wall portions.

Since this alternative structure, too, achieves an airtight seal between the sliding door 73 and the air-conditioner case 3 when the sliding door 73 comes to a sliding end position, a desirable level of seal between the sliding door 73 and the air-conditioner case 3 is assured at either sliding door stop position.

Figure 28:
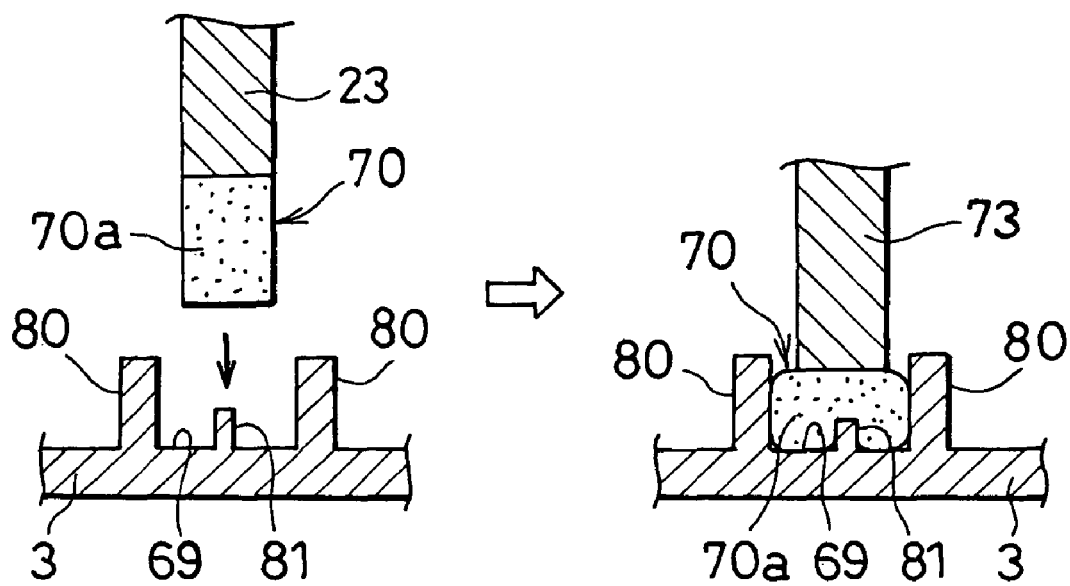
FIG. 28 presents another example of a structure through which the seal member is pressed against the contact portion, showing the seal member before and after it is pressed against the contact portion.

The seal structure described above allows for numerous variations. For instance, a bump 81 projecting along the sliding direction may be formed at the contact portion 69 so as to cause deformation of the seal member 70. In this case, the seal member 70 is caused to become deformed along the direction perpendicular to the sliding direction with a high level of effectiveness to ensure close contact between the sides of the seal member 70 and the inner surfaces of the wall portions 80, as shown in FIG. 28.

Figure 29:
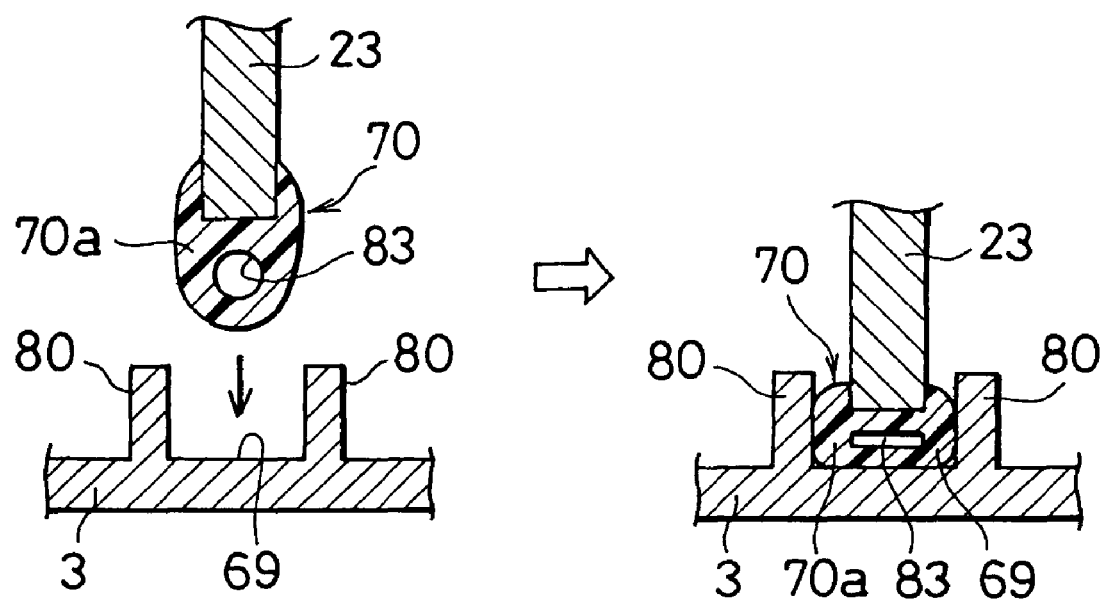
FIG. 29 presents yet another example of a structure through which the seal member is pressed against the contact portion, showing the seal member before and after it is pressed against the contact portion.

Alternatively, the seal member 70 may be constituted as a spherical portion constituted of, for instance, elastomer with an air space 83 formed therein so that as a force is applied along the sliding direction, the seal member becomes readily deformed along the direction perpendicular to the sliding direction, as shown in FIG. 29. This structure, too, allows the seal member 70 to come into close contact with the inner surfaces of the wall portions 80 as it is pressed against the contact portion 69.

Figure 30:
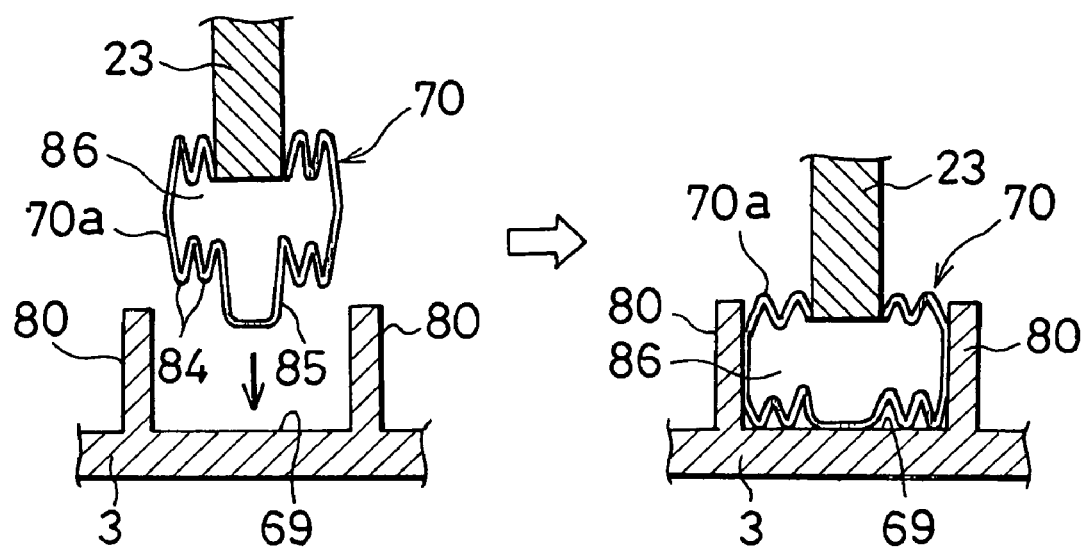
FIG. 30 presents yet another example of a structure through which the seal member is pressed against the contact portion, showing the seal member before and after it is pressed against the contact portion.

As a further alternative, the seal member 70 may be formed as a deformable member that includes, for instance, a bellows portion 84 extending along the direction perpendicular to the sliding direction and a contact portion 85 projecting downward from the center of the bellows portion 84, with fluid filling a space 86 formed inside the seal member 70, as shown in FIG. 30. As the contact portion 85 is pressed down, the bellows portion 84 is allowed to expand sideways so that when the sliding door 23 moves to a sliding stop position and the contact portion 85 becomes pressed against the contact portion 69, the bellows portion 84 is set in close contact with the inner surfaces of the wall portions 80.

Figure 31:
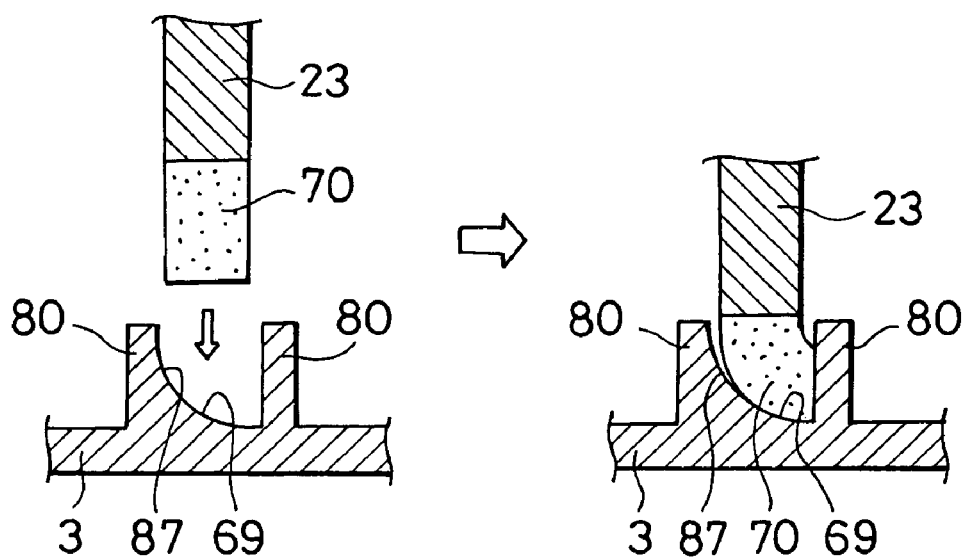
FIG. 31 presents yet another example of a structure through which the seal member is pressed against the contact portion, showing the seal member before and after it is pressed against the contact portion.

While the seal member 70 invariably becomes deformed so as to distend along the direction perpendicular to the sliding direction to achieve close contact with the inner surfaces of the wall portions 80 in any of the structures described above, the wall surfaces of the wall portions 80 disposed on the two sides along the contact portions 69 may be formed so that the distance between the wall surfaces becomes gradually smaller further away from the opening end through which the seal member is inserted, as shown in FIG. 31. In this case, too, the seal member 70 is pressed against the wall portions 80 along a direction different from the sliding direction. In the example presented in the figure, the wall surface at one of the wall portions 80 is formed as a curved surface 87 that gradually approaches the other wall portion so as to press the seal member 70 against the other wall portion 80, thereby achieving a good seal between the sliding door 23 and the air-conditioner case 3 when the sliding door 23 moves to a sliding stop position.

It is to be noted that while the pressure-responsive deformation portion 70a is constituted with the entire seal member 70 in the structural examples presented in FIGS. 27 through 31, a pressure-responsive deformation portion may instead be constituted with a part of each seal member 70, such as an end of the seal member 70.

The invention claimed is:

1. A sliding door device for an air-conditioning system comprising:
   a sliding door that moves so as to intersect an air flow path and is used to control an air flow rate or an air direction within said air flow path;
   wherein two ends of said sliding door each constitute a sliding unit inserted at and moves within a guide groove at an air-conditioner case; and
   wherein said sliding unit includes a tension applying means for applying tension between said sliding unit and said guide groove;
   the sliding unit includes a projected portion and a recessed portion disposed apart from the projected portion, both of which are formed in a sliding direction of the sliding door, the projected portion extending partially along a first longitudinal axis and the recessed portion extending partially along a second longitudinal axis extending parallel to the first longitudinal axis, the projected portion and the recessed portion being connected to one another,
   the tension applying means is formed on the projected portion and comprises a non-contact projection that projects from the projected portion and has a clearance from an inner surface of the guide groove, a point contact projection that comes into contact with the inner surface of the guide groove and a tension bridge, the tension bridge being supported by the projected portion and the point contact projection being supported by the tension bridge thereby applying tension against the inner surface of the guide groove, wherein the non-contact projection is substantially circular, the tension bridge is flat and is surrounded by the non-contact projection and the point contact projection is formed at the center of the tension bridge.

2. A sliding door device for an air-conditioning system according to claim 1, wherein: said clearance is set equal to or less than 1 mm.

3. A sliding door device for an air-conditioning system according to claim 1, wherein: said point contact projection is supported at the tension bridge formed over an area surrounded by the non-contact projection.

* * * * *